(12) United States Patent
Tandai et al.

(10) Patent No.: US 8,094,615 B2
(45) Date of Patent: *Jan. 10, 2012

(54) RADIO COMMUNICATION APPARATUS AND PROGRAM

(75) Inventors: Tomoya Tandai, Tokyo (JP); Tomoya Horiguchi, Inagi (JP); Takeshi Tomizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1208 days.

This patent is subject to a terminal disclaimer.

(21) Appl. No.: 11/879,908

(22) Filed: Jul. 19, 2007

(65) Prior Publication Data

US 2008/0069041 A1    Mar. 20, 2008

(30) Foreign Application Priority Data

Sep. 19, 2006   (JP) ................. 2006-253300

(51) Int. Cl.
*H04W 4/00*   (2009.01)
(52) U.S. Cl. ....... 370/329; 370/445; 455/11.1; 455/224; 455/67.13; 709/222
(58) Field of Classification Search .......... 370/230, 370/445, 346, 329; 455/11.1; 709/222, 238
See application file for complete search history.

(56) References Cited

U.S. PATENT DOCUMENTS

| | | | | |
|---|---|---|---|---|
| 5,737,330 A | * | 4/1998 | Fulthorp et al. | 370/346 |
| 6,975,641 B1 | * | 12/2005 | Kurobe et al. | 370/445 |
| 2003/0033394 A1 | * | 2/2003 | Stine | 709/222 |
| 2006/0281404 A1 | * | 12/2006 | Lee et al. | 455/11.1 |
| 2008/0144493 A1 | * | 6/2008 | Yeh | 370/230 |

FOREIGN PATENT DOCUMENTS

| | | |
|---|---|---|
| JP | 2001-298763 | 10/2001 |
| JP | 2001-358721 | 12/2001 |
| JP | 2004-336387 | 11/2004 |

OTHER PUBLICATIONS

J. Mitola, III; "*Cognitive Radio for Flexible Mobile Multimedia Communications*", IEEE Sixth International Workshop on Mobile Multimedia Communications, pp. 3-10, Nov. 1999.

Office Action (w/translation) dated Jun. 3, 2008 from corresponding Japanese Application No. 2006-2533001.

* cited by examiner

*Primary Examiner* — Kamran Afshar
*Assistant Examiner* — Shahriar Behnamian
(74) *Attorney, Agent, or Firm* — Ohlandt, Greeley, Ruggiero & Perle, L.L.P.

(57) ABSTRACT

A radio communication apparatus includes a first detection unit configured to detect a first signal in a first carrier sense period contained in a pre assigned reception slot, a relaying unit configured to relay the detected first signal, a second detection unit configured to detect a second signal in a second carrier sense period contained in a pre assigned transmission slot, and a stopping unit configured to stop transmission in the transmission slot when the second detection unit detects the second signal.

14 Claims, 22 Drawing Sheets

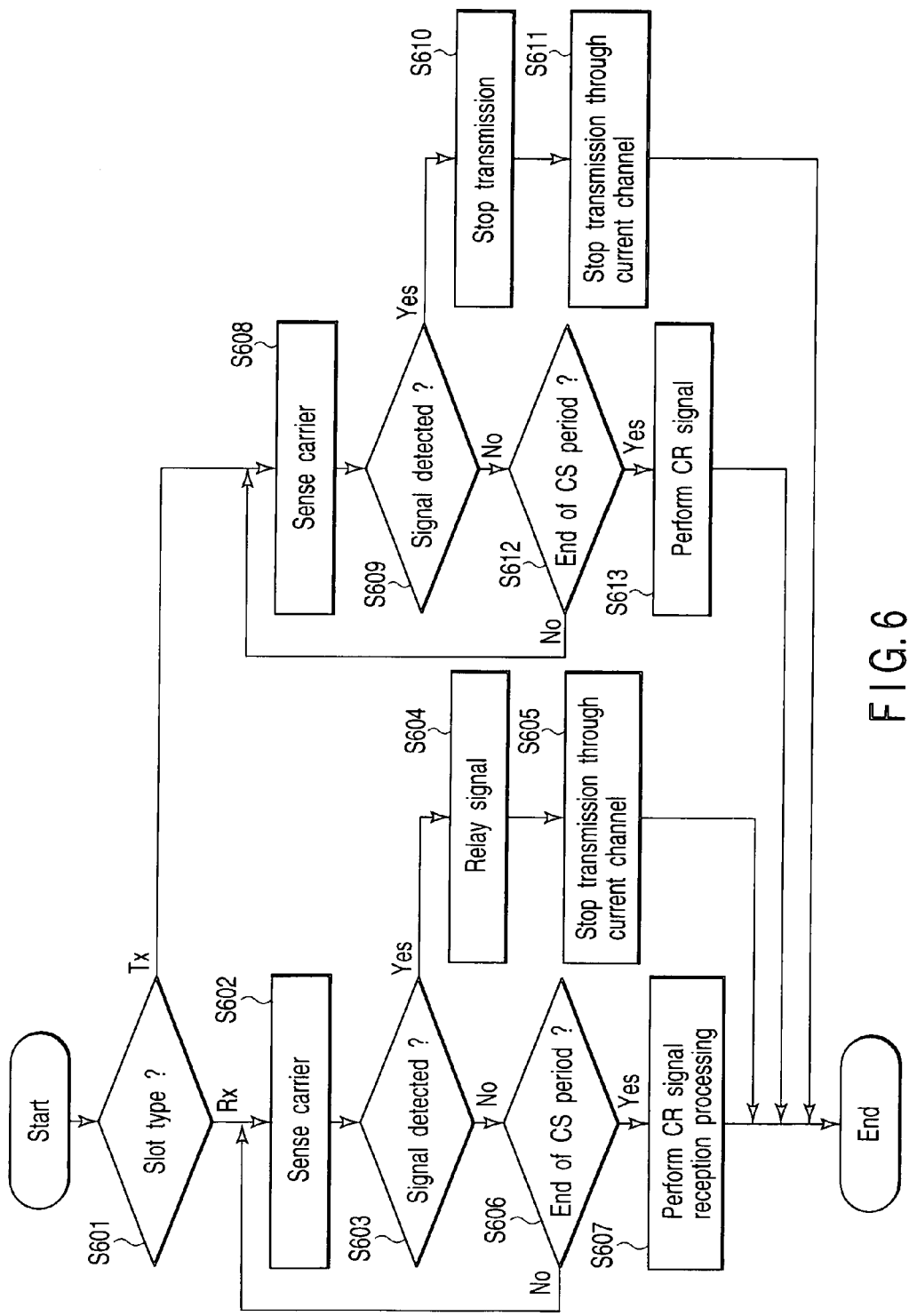
F I G. 6

| Radio communication system | Minimum burst time |
|---|---|
| Radio communication system E | 10ms |
| Radio communication system F | 200us |
| Radio communication system G | Continuous |

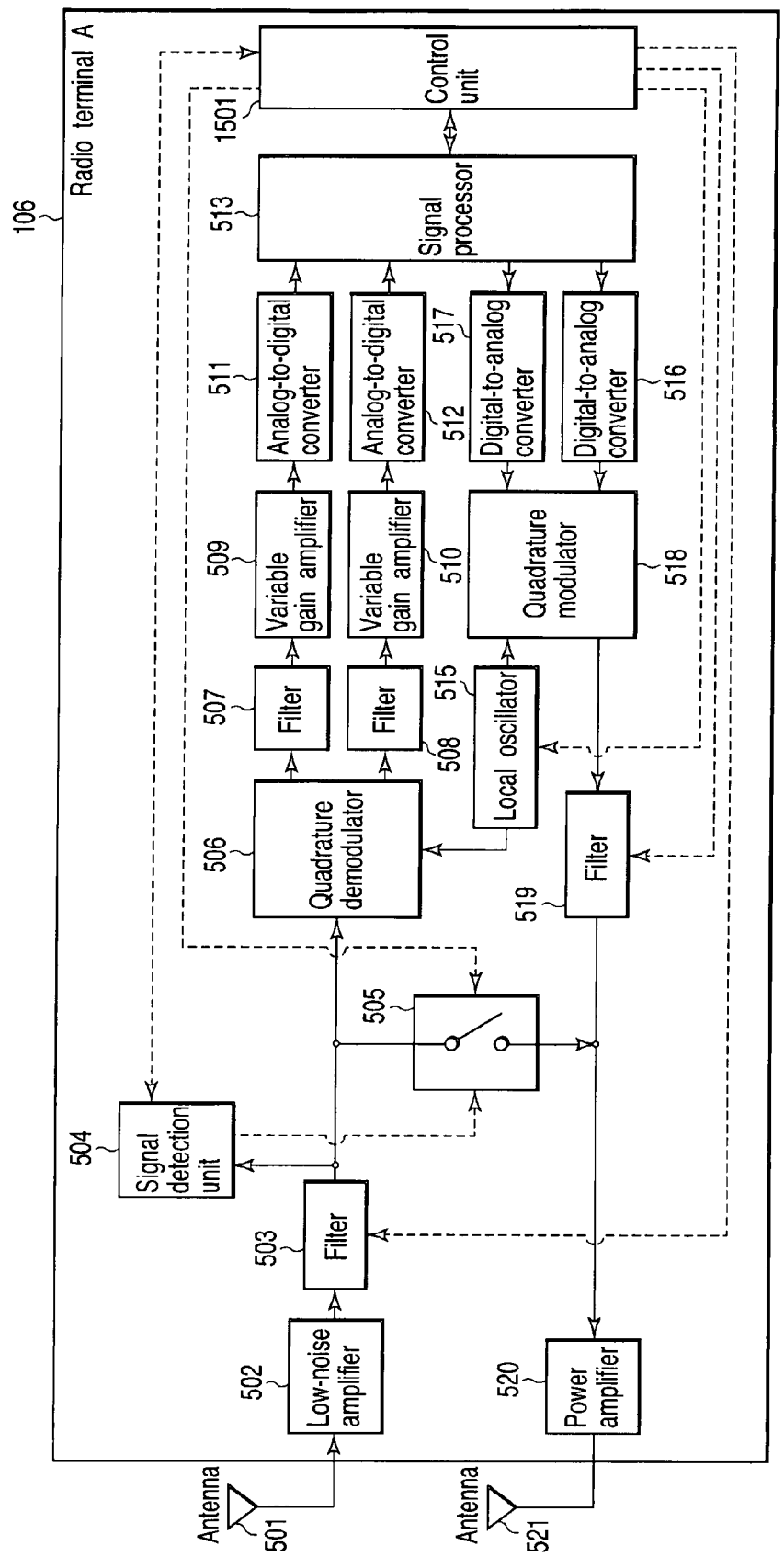
F I G. 15

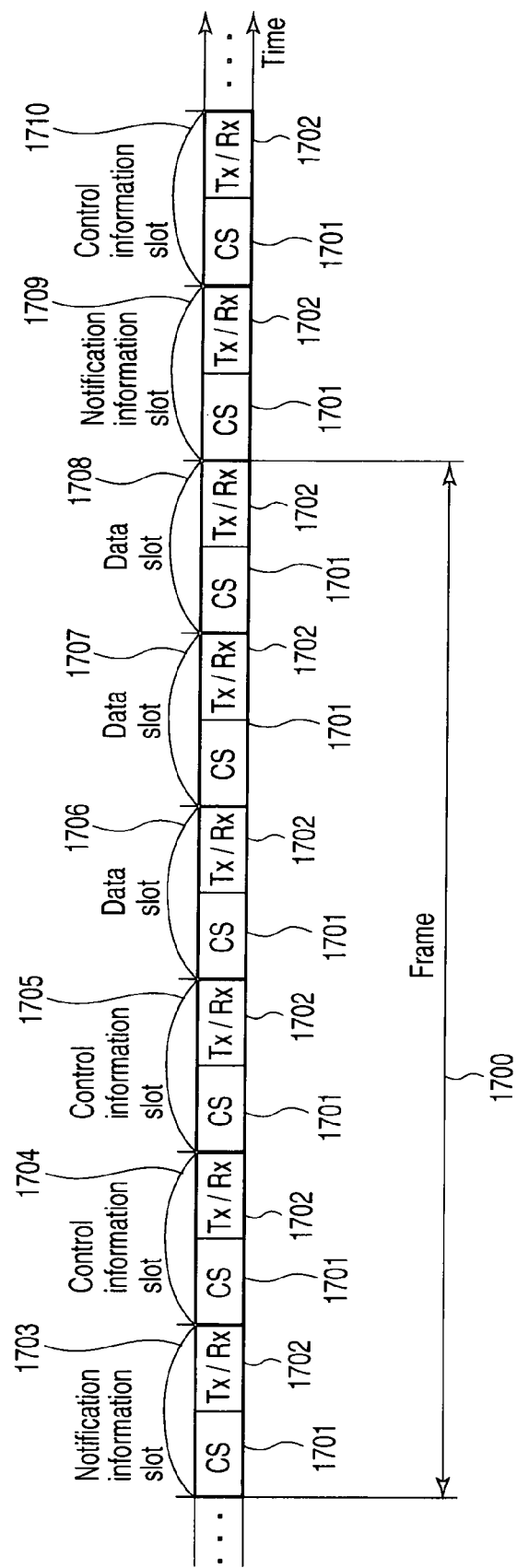
F I G. 17

FIG. 18

| 1801 | 1802 | 1803 | 1804 | 1805 | 1806 | 1807 | 1808 | 1809 | 1810 | 1811 | 1812 |
|---|---|---|---|---|---|---|---|---|---|---|---|
| System identifier | Selected frequency channel | Switching destination frequency channel | Frequency switching timing | Slot time length | Carrier sense period length | Signal transmission /reception period length | Notification information transmission cycle | Control information slot count | Data slot 1 transmission right assignment information | Data slot 2 transmission right assignment information | Data slot 3 transmission right assignment information |

| 1901 | 1902 | 1903 | 1904 | 1905 | 1906 | 1907 | 1908 | 1909 | 1910 | 1911 | 1912 |
|---|---|---|---|---|---|---|---|---|---|---|---|
| System A | 600MHz | 612MHz | 2 slots | 1ms | 0.5ms | 0.5ms | 6 | 2 | A | A1 | A2 |

1900

| Priority | Frequency channel |
|---|---|
| 1 | Ch.5 |
| 2 | Ch.2 |
| 3 | Ch.1 |
| 4 | Ch.6 |
| 5 | Ch.4 |

| Radio communication apparatus | Propagation loss |
|---|---|
| Radio base station A | 50dB |
| Radio terminal A2 | 80dB |

RADIO COMMUNICATION APPARATUS AND PROGRAM

CROSS-REFERENCE TO RELATED APPLICATIONS

This application is based upon and claims the benefit of priority from prior Japanese Patent Application No. 2006-253300, filed Sep. 19, 2006, the entire contents of which are incorporated herein by reference.

BACKGROUND OF THE INVENTION

1. Field of the Invention

The present invention relates to a radio communication apparatus included in each of a plurality of radio systems which share a frequency band, and a program.

2. Description of the Related Art

Conventionally, there is known a radio communication apparatus included in each of a plurality of radio systems which share a frequency band. According to conventional radio communication apparatuses of this type, a radio communication apparatus with low priority performs carrier detection within a shared frequency band, and transmits a signal when determining that the shared frequency band is not used by a radio system with high priority (see, for example, J. Mitola III, "Cognitive Radio for Flexible Mobile Multimedia Communications", IEEE Sixth International Workshop on Mobile Multimedia Communications (MoMuC99), pp. 3-10, No. 1999).

Conventionally, there is known a technique of reducing interference given to another radio communication system using the same frequency band and also reducing characteristic deterioration due to interference given from another system (see, for example, JP-A 2001-298763 (KOKAI)).

According to the above conventional technique, when a base station detects by carrier sense that there is no radio station which does not belong to the self radio communication system, the base station transmits an idle signal as a signal notifying that a communication channel is available to a terminal. Upon receiving the idle signal, the terminal transmits a desired communication packet to the base station. In this case, the base station at its current position detects that the communication channel is available, but the terminal at its current position does not detect that the communication channel is available. For this reason, a signal transmitted from the terminal interferes with a radio station which does not belong to the self radio communication system.

BRIEF SUMMARY OF THE INVENTION

In accordance with an aspect of the invention, there is provided a radio communication apparatus, comprising: a first detection unit configured to detect a first signal in a first carrier sense period contained in a pre assigned reception slot; a relaying unit configured to relay the detected first signal; a second detection unit configured to detect a second signal in a second carrier sense period contained in a pre assigned transmission slot; and a stopping unit configured to stop transmission in the transmission slot when the second detection unit detects the second signal.

BRIEF DESCRIPTION OF THE SEVERAL VIEWS OF THE DRAWING

FIG. 6 is a flowchart showing an example of processing by the radio communication apparatus in FIG. 5 within one slot;

FIG. 15 is a block diagram of a radio communication apparatus according to the third embodiment;

FIG. 17 is a view showing a frame format in a radio communication system A in the third embodiment;

FIG. 18 is a view showing the contents of notification information which a radio base station A in the third embodiment transmits;

FIG. 19 is a view showing an example of the notification information in FIG. 18;

DETAILED DESCRIPTION OF THE INVENTION

A radio communication apparatus and a program according to embodiments will be described in detail below with reference to the views of the accompanying drawing.

The radio communication apparatus and the program according to the program allow to transmit and receive information by using the same frequency band as that of another radio communication system without giving interference to the other radio communication system.

Figure 1:
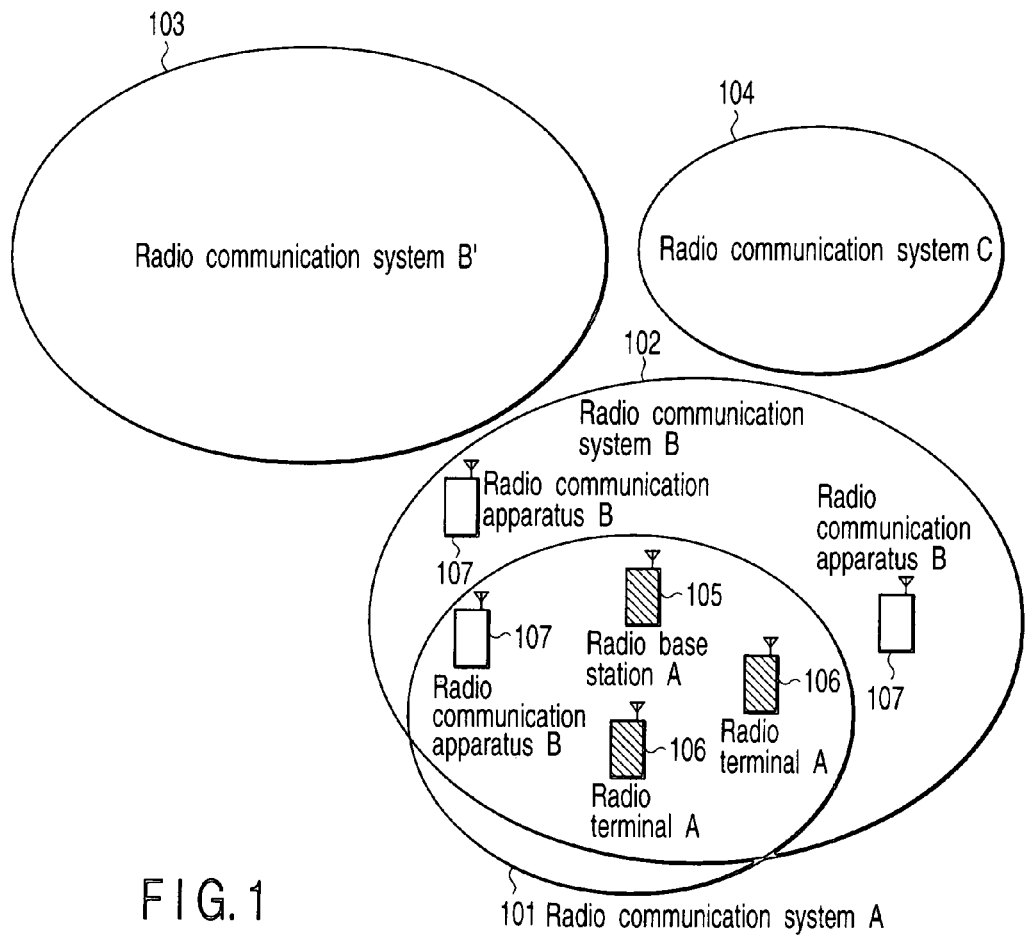
FIG. 1 is a view showing a radio communication system in which a radio base station and radio terminals as radio communication apparatuses according to embodiments perform radio communication with each other, and other radio communication systems.

A radio communication system in which a radio base station and a radio terminal as radio communication apparatuses according to the embodiment, perform radio communication with each other will be described with reference to FIG. 1. FIG. 1 is a view showing an example of the schematic arrangement of a radio communication system A 101 in which a radio base station A 105 and a radio terminal A 106 perform radio communication with each other.

FIG. 1 shows the radio communication system A 101 in which the radio base station A 105 and the radio terminal A 106 perform radio communication with each other, and other radio communication system B 102 and radio communication system C 104 different from the radio communication system A. As shown in FIG. 1, the radio communication system B 102 different from the radio communication system A 101 may be located at a position where it overlaps the radio communication system A or may be located at a position where it is geometrically separated from a radio communication system B' 103. As the radio communication system B and the radio communication system C, for example, there are available cellular systems such as the Wideband Code-Division Multiple Access (W-CDMA) system, the Global Standard for Mobile Communication (GSM) system, and the Personal Digital Cellular (PDC) system; metropolitan area networks (MANs) such as IEEE 802.16e; local area networks (LANs) such as IEEE 802.11; maritime radio systems; radar systems; and fixed microwave systems. The radio communication system A 101 is a system which is not currently set as a standard but will be set as a standard in the future. As the radio communication system A, for example, a system based on orthogonal frequency division multiplexing (OFDM) or a spread spectrum communication scheme is assumed.

The radio base station A 105 and radio terminal A 106 which belong to the radio communication system A 101 perform radio communication by sharing a frequency band with the radio communication system B 102. The radio communication system A 101 is assigned higher priority in the use of a frequency than the radio communication system B 102. Therefore, the radio base station A 105 and radio terminal A 106 which belong to the radio communication system A 101 should not disturb radio communication which a radio communication apparatus B 107 belonging to the radio communication system B 102 performs. The radio communication system A performs, for example, cognitive radio communication (Cognitive Radio). Note that in the accompanying drawings, Cognitive Radio is abbreviated as CR.

A plurality of frequency channels assigned to the radio communication systems B and C will be described next with reference to FIG. 2.

Figure 2:
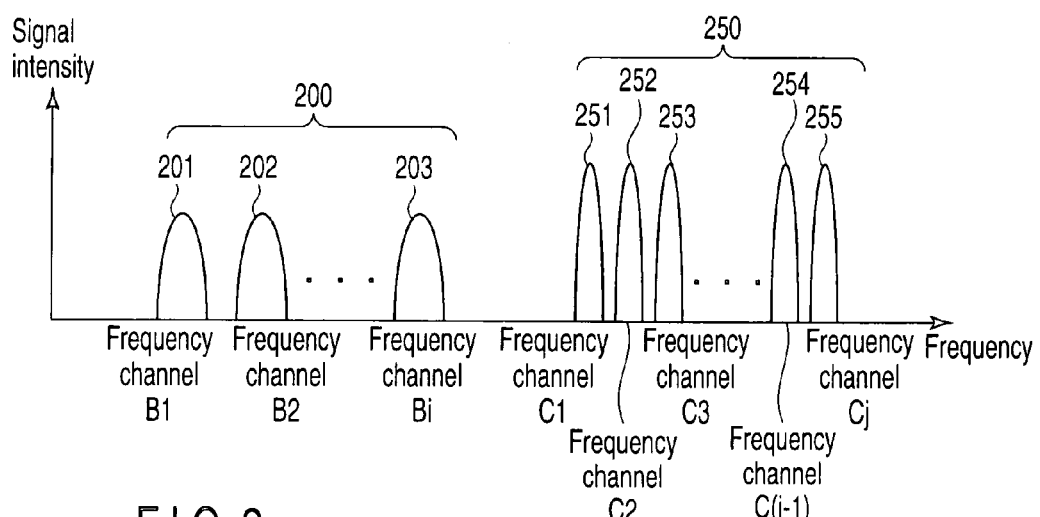
FIG. 2 is a graph showing a plurality of frequency channels assigned to a radio communication system B and a radio communication system C in FIG. 1.

FIG. 2 shows a plurality of frequency channels B1 201, B2 202, ..., Bi 203 in a frequency band 200 assigned to the radio communication system B 102, and a plurality of frequency channels C1 251, C2 252, ..., Cj 255 in a frequency band 250 assigned to the radio communication system C 104. The radio base station A 105 and the radio terminal A 106 which belong to the radio communication system A 101 shown in FIG. 1 share, for example, the assigned frequency channel B1 201 shown in FIG. 2. However, the radio communication system A 101 is permitted to use a frequency with lower priority than the radio communication system B 102, and hence the radio base station A 105 and the radio terminal A 106 which belong to the radio communication system A 101 must not disturb radio communication which the radio communication apparatus B 107 belonging to the radio communication system B 102 performs.

FIGS. 1 and 2 have exemplified the radio communication system B 102 as a radio communication system with which the radio communication system A 101 shares a frequency band. However, the number of radio communication systems with which the radio communication system A 101 shares a frequency band is not specifically limited. For example, the radio communication system A 101 may share a frequency band with a radio communication system C, a radio communication system D, and the like different from the radio communication system B 102. In this case as well, the radio communication system A 101 is permitted to use the frequency band with lower priority than the radio communication system C, the radio communication system D, and the like.

The following will describe a case wherein the radio communication system B 102 shown in FIG. 1 performs radio communication by sharing the frequency channel B1 201 shown in FIG. 2 with the radio communication system A 101.

The slot arrangement of the radio communication system A 101 in FIG. 1 will be described next with reference to FIG. 3.

Figure 3:
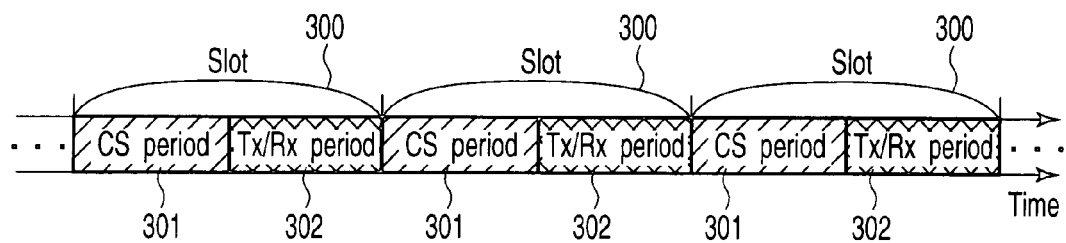
FIG. 3 is a view showing a slot arrangement in a radio communication system A in FIG. 1.

As shown in FIG. 3, one slot 300 assigned to each of the radio base station A 105 and the radio terminal A 106 contains a carrier sense period (CS period) 301 and a signal transmission/reception period (Tx/Rx period) 302. In a carrier sense period, it is detected whether any system having a license is communicating in the frequency band which the radio communication system A desires to use. FIG. 3 shows a case wherein the ratio in length between the carrier sense period 301 and the signal transmission/reception period 302 in the slot 300 is 1:1. However, the ratio is not necessarily 1:1, and may be an arbitrary ratio. The radio communication system A 101 performs radio communication by repeatedly using one slot in FIG. 3.

Figure 4:
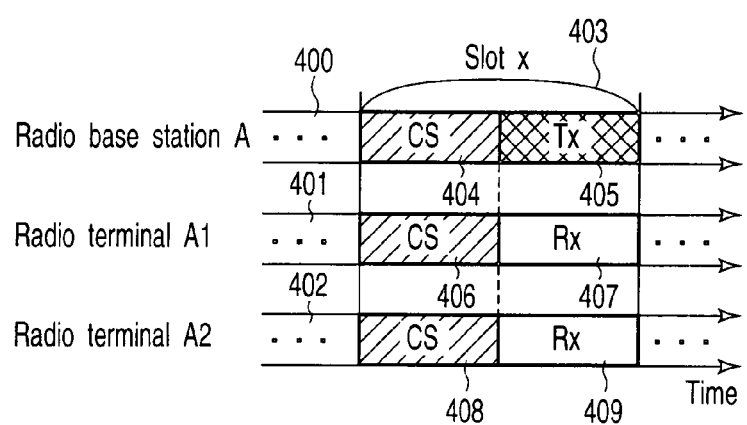
FIG. 4 is a view showing sequences and slot arrangements for a base station and terminals included in the radio communication system A in FIG. 1.

A case wherein the slot shown in FIG. 3 is assigned to each of the radio base station A and a plurality of radio terminals A (radio terminals A1 and A2) will be described next with reference to FIG. 4. FIG. 4 is a sequence chart showing a case wherein the slot shown in FIG. 3 is assigned to each of the radio base station A 105, radio terminal A1 106, and radio terminal A2 106.

FIG. 4 shows a sequence 400 for the radio base station A 105, a sequence 401 for the radio terminal A1 106, and a sequence 402 for the radio terminal A2 106. FIG. 4 shows a case wherein a transmission slot is assigned to the radio base station A 105 in a slot x 403.

Referring to FIG. 4, since the transmission slot is assigned to the radio base station A 105, the radio base station A 105 performs carrier sense in a carrier sense period 404 in the slot x 403, and performs signal transmission processing in a signal transmission/reception period 405 after the carrier sense period. On the other hand, the slots x 403 assigned to the radio terminal A1 106 and radio terminal A2 106 becomes a reception slot, the radio terminals sense a carrier in carrier sense periods 406 and 408 in the slots x 403, and perform signal reception processing in signal transmission/reception periods 407 and 409 after the carrier sense periods. In the respective sequences shown in FIG. 4, carrier sense starts and ends and a signal transmission/reception period starts and ends at the same times. That is, the radio base station A, radio terminal A1, and radio terminal A2 are synchronous with each other.

First Embodiment

Figure 5:
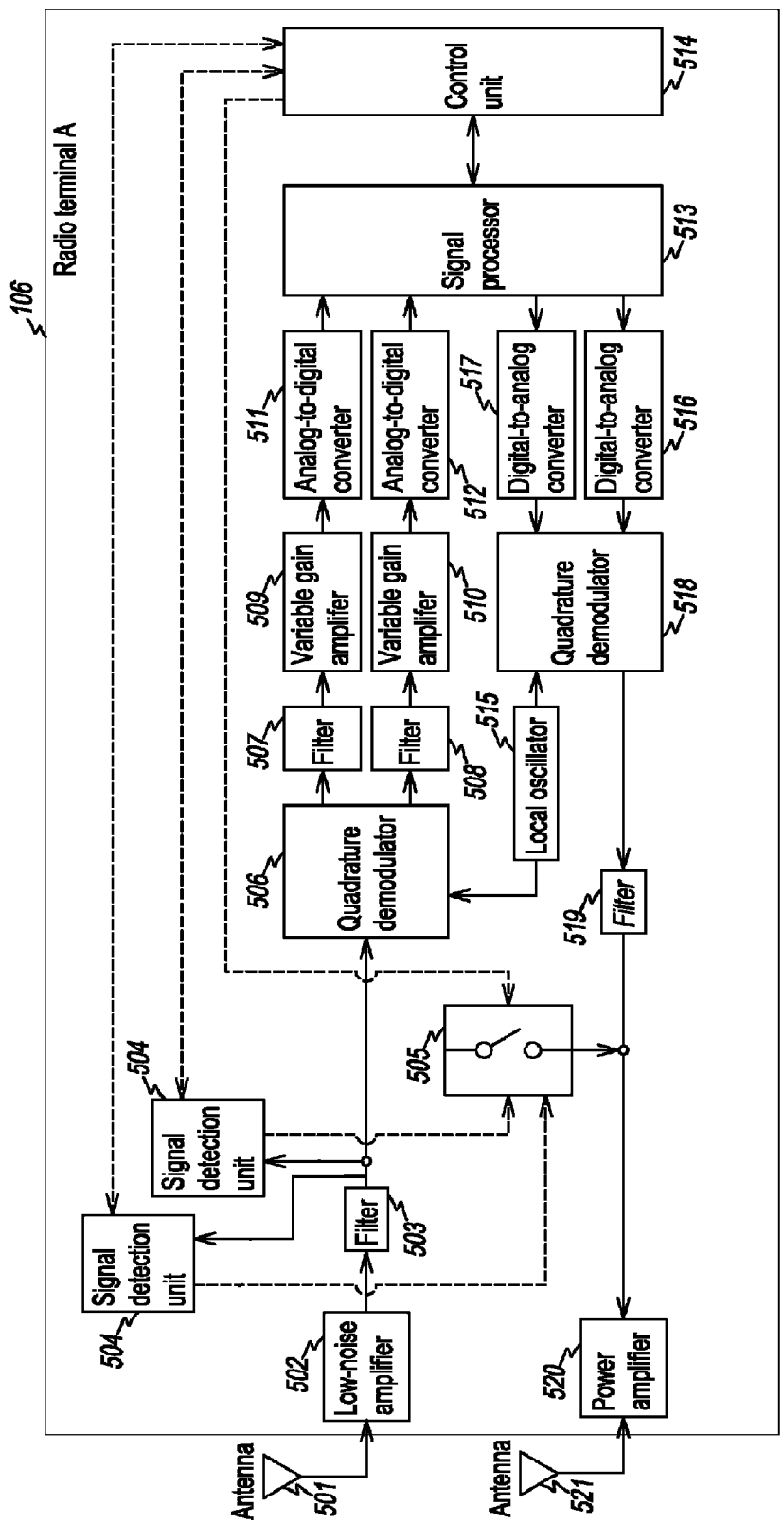
FIG. 5 is a block diagram of a radio communication apparatus according to the first embodiment.

A radio terminal A as an example of a radio communication apparatus according to the first embodiment will be described with reference to FIG. 5. FIG. 5 is a block diagram showing an example of the schematic arrangement of a radio terminal A 106 according to the first embodiment.

The radio terminal A 106 in FIG. 1 comprises a receiving antenna 501, low-noise amplifier 502, filter 503, signal detection unit 504, switch 505, quadrature demodulator 506, filters 507 and 508, variable gain amplifiers 509 and 510, analog-to-digital converters 511 and 512, signal processor 513, control unit 514, local oscillator 515, digital-to-analog converters 516 and 517, quadrature modulator 518, filter 519, power amplifier 520, and transmitting antenna 521. FIG. 5 is a block diagram of the radio terminal A 106 in a radio communication system A 101. The block diagram of a radio base station A 105 in the radio communication system A 101 is the same as that shown in FIG. 5.

The receiving antenna 501 receives a signal from the radio base station A and transfers it to the low-noise amplifier 502. The low-noise amplifier 502 amplifies the signal from the receiving antenna 501 to a desired amplitude. The filter 503 filters the signal from the low-noise amplifier 502.

The signal detection unit 504 determines whether it has detected a signal during a carrier sense period. That is, the signal detection unit 504 detects the reception power (RSSI) of the signal, and compares the reception power with a predetermined threshold to determine whether the reception power of the signal exceeds the threshold, thereby determining whether it has detected a signal.

The switch 505 switches between transferring the output signal from the filter 503 to the power amplifier 520 and not transferring it on the basis of an instruction from the control unit 514. The quadrature demodulator 506 performs quadrature demodulation of the output signal from the filter 503. The filters 507 and 508 filter the in-phase component and quadrature component of the quadrature demodulator output. The variable gain amplifiers 509 and 510 change the gains to make input signals to the analog-to-digital converters 511 and 512 become proper values. The analog-to-digital converters 511 and 512 convert analog signals as output signals from the variable gain amplifiers 509 and 510 into digital signals. The signal processor 513 performs processing on the basis of the reception signal and converts transmission data into a transmission signal.

The control unit 514 controls the signal detection unit 504 and the switch 505 on the basis of the signal received from the signal processor 513 and the detection result obtained by the signal detection unit 504. The details of the contents of processing by the control unit 514 will be described later with reference to FIG. 6.

The local oscillator 515 generates frequency signals used by the quadrature demodulator 506 and the quadrature modulator 518. The digital-to-analog converters 516 and 517 convert output signals from the digital signals output from the processor 513 into analog signals. The quadrature modulator 518 quadrature-modulates output signals from the digital-to-analog converters 516 and 517. The filter 519 filters the signal from the quadrature modulator 518. The power amplifier 520 amplifies the signal filtered by the filter 519 or the signal filtered by the filter 503 to desired power, and transmits the resultant signal to the transmitting antenna 521.

An example of processing by the radio terminal A in FIG. 5 within one slot will be described next with reference to FIG. 6. FIG. 6 is a flowchart showing an example of processing by the radio terminal A 106 within one slot.

The control unit 514 performs slot type determination at the start time of a slot to determine whether the current slot is a transmission slot assigned to the self station or a reception slot (step S601). Upon determining that the current slot is a reception slot, the control unit 514 controls the signal detection unit 504 to sense a carrier (step S602). In such carrier sensing, the signal detection unit 504 detects, for example, the reception power (RSSI) of a signal input through the receiving antenna 501, low-noise amplifier 502, and the filter 503, compares the reception power with a predetermined threshold, and determines that it has detected a signal, if the reception power of the signal exceeds the threshold, and determines that it has not detected any signal, if the reception power of the signal does not exceed the threshold. The signal detection unit 504 determines whether it has detected a signal during a carrier sense period (step S603). Upon determining that no signal is detected, the signal detection unit 504 determines whether the carrier sense period has come to an end (step S606). Upon determining that the carrier sense period has not come to an end, the signal detection unit 504 continues carrier sense (step S602). Upon determining that the carrier sense period has come to an end, the signal detection unit 504 performs signal reception processing in a signal transmission/reception period in this slot (step S607).

If the signal detection unit 504 determines in step S603 that it has detected a signal, the control unit 514 turns on the switch 505 (that is, the control unit 514 connects the filter 503 to the power amplifier 520) and transfers the output signal from the filter 503 to the power amplifier 520 (step S604). That is, the control unit 514 inputs the detected signal to a circuit on the transmitting side and relays it through the power amplifier 520 and the transmitting antenna 521 (step S604). At this time, the control unit 514 turns off the power supply of the quadrature demodulator 506. Obviously, the control unit 514 may turn off the power supply of any unnecessary device located on the output side of the quadrature demodulator 506. This embodiment exemplifies so-called non-regenerative relay operation in which the control unit 514 inputs the detected signal to a circuit on the transmitting side and transmitting it without inputting it to the block behind the switch 505 and without demodulating it or re-modulating the demodulated signal. Upon relaying the signal, the control unit 514 stops communication through the frequency channel through which the radio communication system A is performing radio communication (step S605).

Upon detecting in step S601 that the current slot is a transmission slot, the control unit 514 performs carrier sense by controlling the signal detection unit 504 (step S608). The signal detection unit 504 determines whether it has detected a signal during the carrier sense period (step S609). Upon determining that no signal is detected, the signal detection unit 504 determines that the carrier sense period has come to an end (step S612). Upon determining that the carrier sense period has not come to an end, the control unit 514 continues the carrier sense (step S608). Upon determining that the carrier sense has come to an end, the control unit 514 transmits a signal in the signal transmission/reception period in this slot (step S613). If the signal detection unit 504 determines in step S609 that it has detected a signal in the carrier sense, the signal detection unit 504 outputs, to the control unit 514, a control signal indicating that the signal detection unit 504 has detected a signal, and the control unit 514 stops the transmission of a signal in the signal transmission/reception period in this slot (step S610), and also stops the communication through the frequency channel through which the radio communication system A is performing radio communication (step S611).

The placement of a radio base station and radio terminals which belong to the radio communication system A and a radio communication apparatus belonging to the radio communication system B in the first embodiment will be described with reference to FIG. 7. A sequence of signals transmitted/received between the radio base station A 105, a radio terminal A1 701, a radio terminal A2 702, and a radio communication apparatus B1 706 shown in FIG. 7 will be described with reference to FIG. 8.

Figure 7:
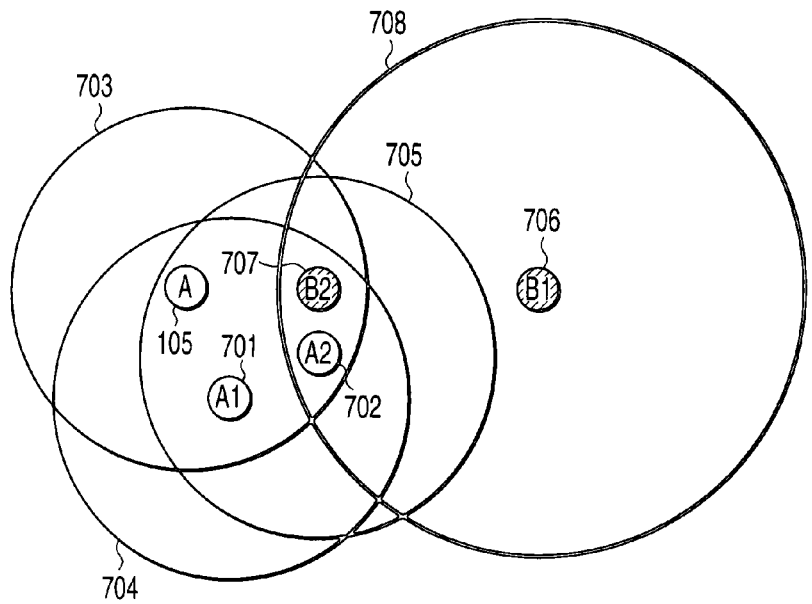
FIG. 7 is a view showing the placement of base stations and terminals in the radio communication system A and radio communication system B according to the first embodiment.

FIG. 7 shows the radio base station A 105, radio terminal A1 701, and radio terminal A2 702 which belong to the radio communication system A, a coverage 703 of signals which the radio base station A 105 transmits, a coverage 704 of signals which the radio terminal A1 701 transmits, a coverage 705 of signals which the radio terminal A2 702 transmits, the radio communication apparatus B1 706 and a radio communication apparatus B2 707 which belong to the radio communication system B, and a coverage 708 of signals which the radio communication apparatus B1 706 transmits.

Figure 8:
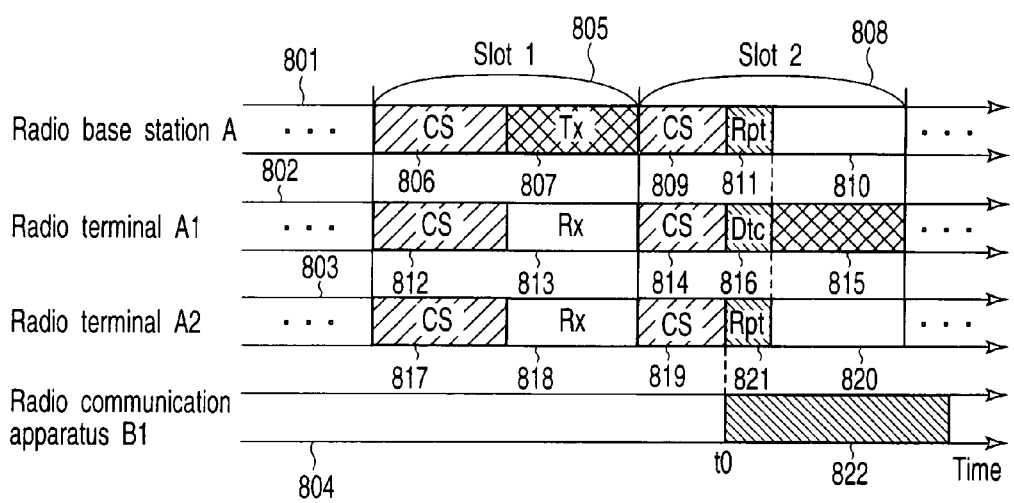
FIG. 8 is a view showing sequences and slot arrangements for a base station and terminals included in the radio communication system A in FIG. 1 and a radio communication apparatus included in the radio communication system B.

FIG. 8 shows a sequence 801 of the radio base station A 105, a sequence 802 of the radio terminal A1 701, a sequence 803 of the radio terminal A2 702, a sequence 804 of the radio communication apparatus B1 706, a carrier sense period 806 and signal transmission/reception period 807 of the radio base station A 105 in a slot 1 805, a carrier sense period 812 and signal transmission/reception period 813 of the radio terminal A1 701, a carrier sense period 817 and signal transmission/reception period 818 of the radio terminal A2 702, a carrier sensor period 809 and signal transmission/reception period 810 of the radio base station A 105 in a slot 2 808, a period (Rpt: Repetition) 811 in which a signal from the radio communication apparatus B1 706 is relayed in the signal transmission/reception period 810 and the carrier sense period 809, a carrier sense period 814 and signal transmission/reception period 815 of the radio terminal A1 701, a period (Dtc: Detection) 816 in which a signal from the radio communication apparatus B1 706 is detected, a carrier sense period 819 and signal transmission/reception period 820 of the radio terminal A2 702, a period 821 in which a signal from the radio communication apparatus B1 706 is relayed, and a signal 822 which the radio communication apparatus B1 706 transmits to the radio communication apparatus B2 707.

Consider a case wherein the radio communication apparatus B1 706 shown in FIG. 7 transmits the signal 822 to the radio communication apparatus B2 707 at time t0 in FIG. 8. In this case, as shown in FIG. 7, only the radio terminal A2 702 of the radio communication apparatuses belonging to the radio communication system A 101 can detect the signal 822. Time t0 at which the transmission of the signal 822 starts is located in the carrier sense period in the slot 2 808 in the radio communication system A 101. The radio terminal A1 701 to which the slot 2 808 is assigned as a transmission slot cannot detect the signal 822. For this reason, if this embodiment is not applied to this operation, the radio terminal A1 701 transmits a signal in the signal transmission/reception period 815 of the slot 2 808, and the signal transmitted from the radio terminal A1 701 interferes with a signal which the radio communication apparatus B2 707 receives from the radio communication apparatus B1 706.

When this embodiment is applied to the above case, the radio terminal A2 702 which has detected the signal 822 in the carrier sense period 819 of the slot 2 808 non-regeneratively relays the detected signal (period 821), and the radio terminal A1 701 to which the slot 2 808 is assigned as a transmission slot can detect the signal which the radio terminal A2 702 has non-regeneratively transmitted in the period 821. Detecting this signal makes it possible for the radio terminal A1 701 to stop the transmission of a signal in the signal transmission/reception period 815 of the slot 2 808. This makes it possible to prevent the radio terminal A1 701 from interfering with the radio communication apparatus B2 707 which receives a signal from the radio communication apparatus B1 706. Note that the radio base station A 105 which detects a signal which the radio terminal A2 702 non-regeneratively transmits in the period 821 of the carrier sense period of the slot 2 808 cannot discriminate whether the detected signal is a signal which the radio terminal A2 702 non-regeneratively transmits or the radio communication apparatus B1 706 transmits, and hence non-regeneratively transmits the detected signal in the same manner as the radio terminal A2 702 (period 811).

According to the first embodiment described above, when a signal is detected in a carrier sense period of a reception slot, the signal is non-regeneratively transmitted. This makes it possible to notify the overall self radio communication system of the existence of another radio communication system with higher priority, thereby stopping planned transmission. This can prevent interference with another radio communication system. In addition, this instantly notifies the self radio communication system of the existence of another radio communication system, and hence can switch the operating frequency channel of the self radio communication system to a new frequency channel, thereby suppressing the time of communication interruption to a short time.

Second Embodiment

Figure 9:
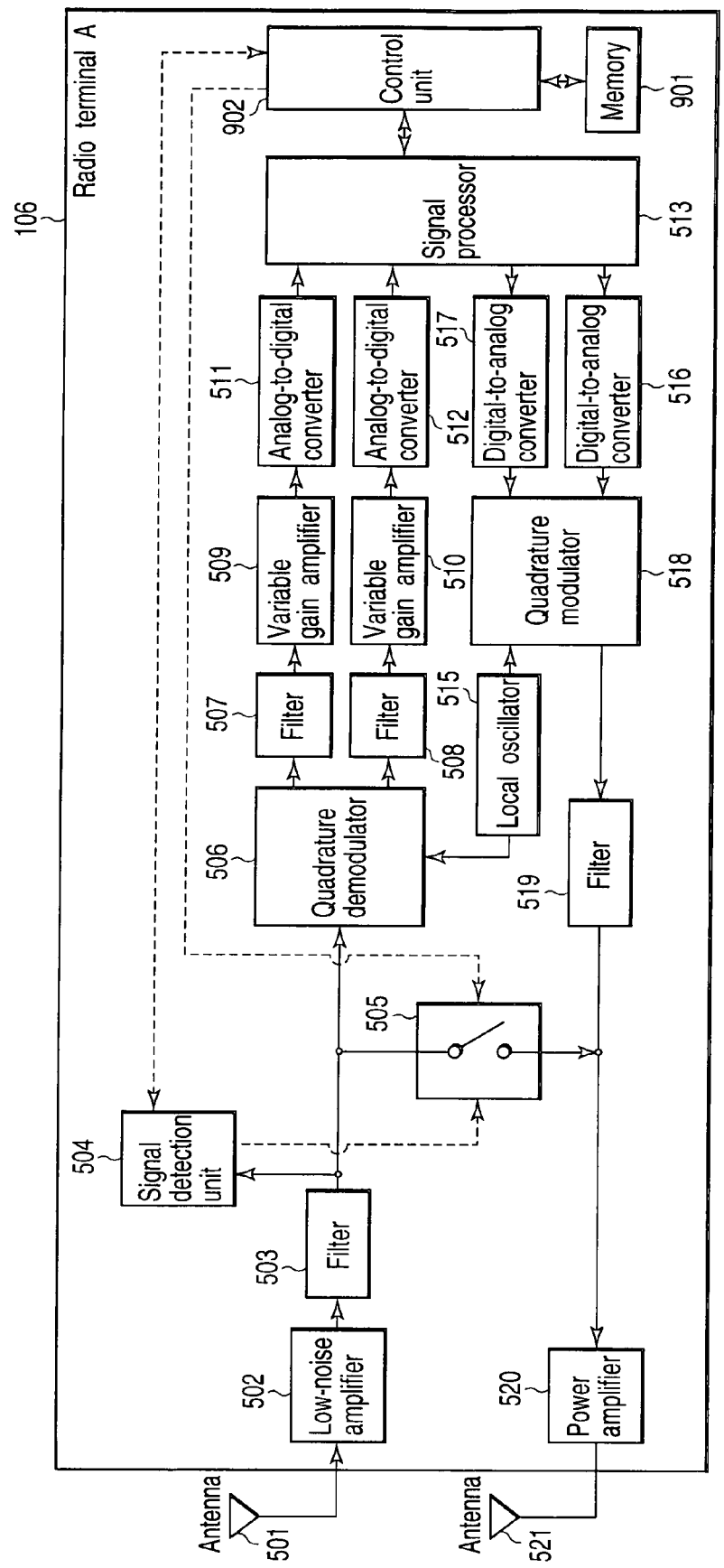
FIG. 9 is a block diagram of a radio communication apparatus according to the second embodiment.

A radio terminal A as an example of a radio communication apparatus according to the second embodiment will be described with reference to FIG. 9. FIG. 9 is a block diagram showing an example of the schematic arrangement of a radio terminal A 106 according to the second embodiment.

The radio terminal A 106 in the second embodiment is obtained by adding a memory 901 to the radio terminal A 106 in the first embodiment shown in FIG. 5. Therefore, the same reference numbers as in FIG. 5 denote the same parts in this embodiment, and a repetitive description will be omitted. The same reference numbers as in the above apparatus denote the same parts in the apparatus of this embodiment, and a description thereof will be omitted.

The memory 901 stores in advance information about a minimum duration period in which a radio communication apparatus belonging to a radio system with which a radio communication system A 101 shares a frequency continuously transmits a signal by one transmission. The memory 901 connects to a control unit 902 to accept read access and write access from the control unit 902.

The control unit 902 refers to the memory 901 to determine whether the minimum burst length of the radio communication system selected by the control unit 902 is continuous. The details of the operation of the control unit 902 will be described later with reference to FIG. 11.

Figures 10, 11:
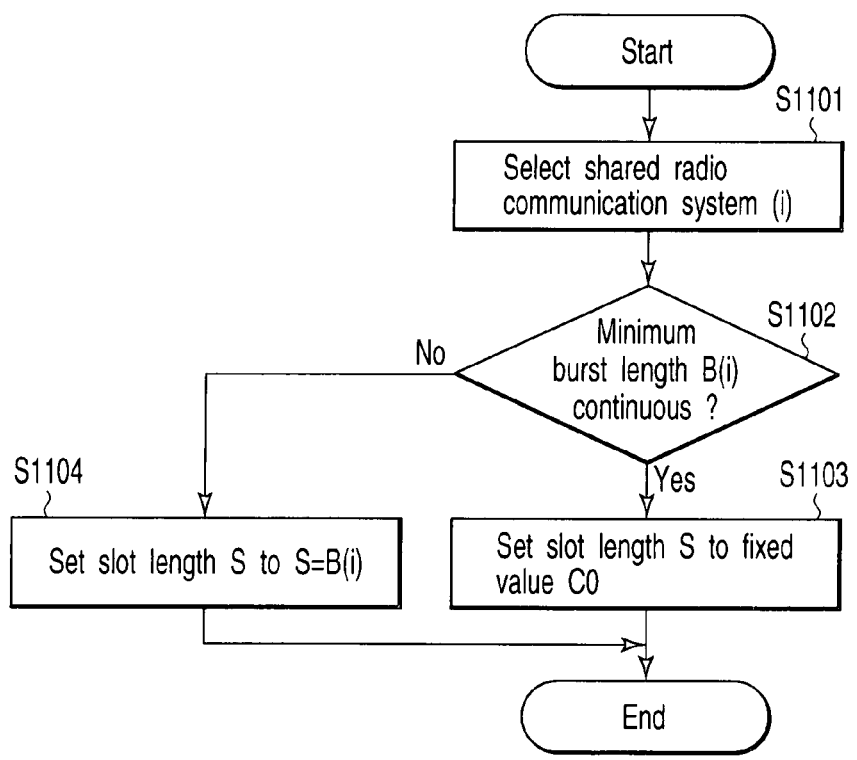
FIG. 10 is a view showing contents stored in a memory in FIG. 9.
FIG. 11 is a flowchart showing an example of processing performed by a radio base station A in FIG. 1 to determine the length of one slot.

Information stored in the memory 901 in FIG. 9 will be described next with reference to FIG. 10. FIG. 10 is a table showing an example of information about the minimum signal duration period for each radio communication system which is stored in the memory 901 in FIG. 9 in advance.

As shown in FIG. 10, the minimum duration time of a signal which a radio communication apparatus belonging to a radio communication system E continuously transmits by one transmission is 10 ms, and the radio communication apparatus belonging to the radio communication system E transmits/receives a signal having a duration time equal to or more than 10 ms, e.g., 20 ms or 80 ms, depending on the type of data to be transmitted. Likewise, FIG. 10 shows that the minimum duration time of a signal which a radio communication apparatus belonging to a radio communication system F continuously transmits by one transmission is 200 ms, and a radio communication apparatus belonging to a radio communication system G continuously transmits a signal. The radio communication system G is, for example, a broadcast system. When a signal is to be continuously transmitted, a predetermined code is written in the table in advance.

An example of processing in which a radio base station A determines the time of one slot will be described next with reference to FIG. 11. FIG. 11 is a flowchart showing an example of processing in which a radio base station A 105 of the radio communication system A 101 determines the time of one slot. Note that the radio base station A has the same arrangement as that of the radio terminal A in FIG. 9.

The radio base station A 105 selects a radio communication system i with which the control unit 902 shares a frequency (step S1 101). This selection may be heuristically performed. For example, it suffices to check frequency bands in the order of the radio communication system E, the radio communication system F, and the like, and select a system with an available frequency band. Upon selecting the radio communication system with which the self radio communication system shares a frequency, the control unit 902 refers to the table shown in FIG. 10 stored in the memory 901 to determine whether the minimum burst length of the selected radio communication system is continuous (step S1102). Upon determining that a minimum burst length B(i) is continuous, the control unit 902 sets a fixed value CO determined as a slot length S (step S1103). Upon determining that the minimum burst length B(i) is not continuous, the control unit 902 sets the minimum burst length B(i) as the slot length S (step S1104). In this case, although the minimum burst length B(i) is set as the slot length S, since one slot contains a carrier sense period and a signal transmission/reception period, the signal transmission/reception period in one slot is set to be shorter than the minimum burst time of the radio communication system with which the self radio communication system shares a frequency.

Figure 12:
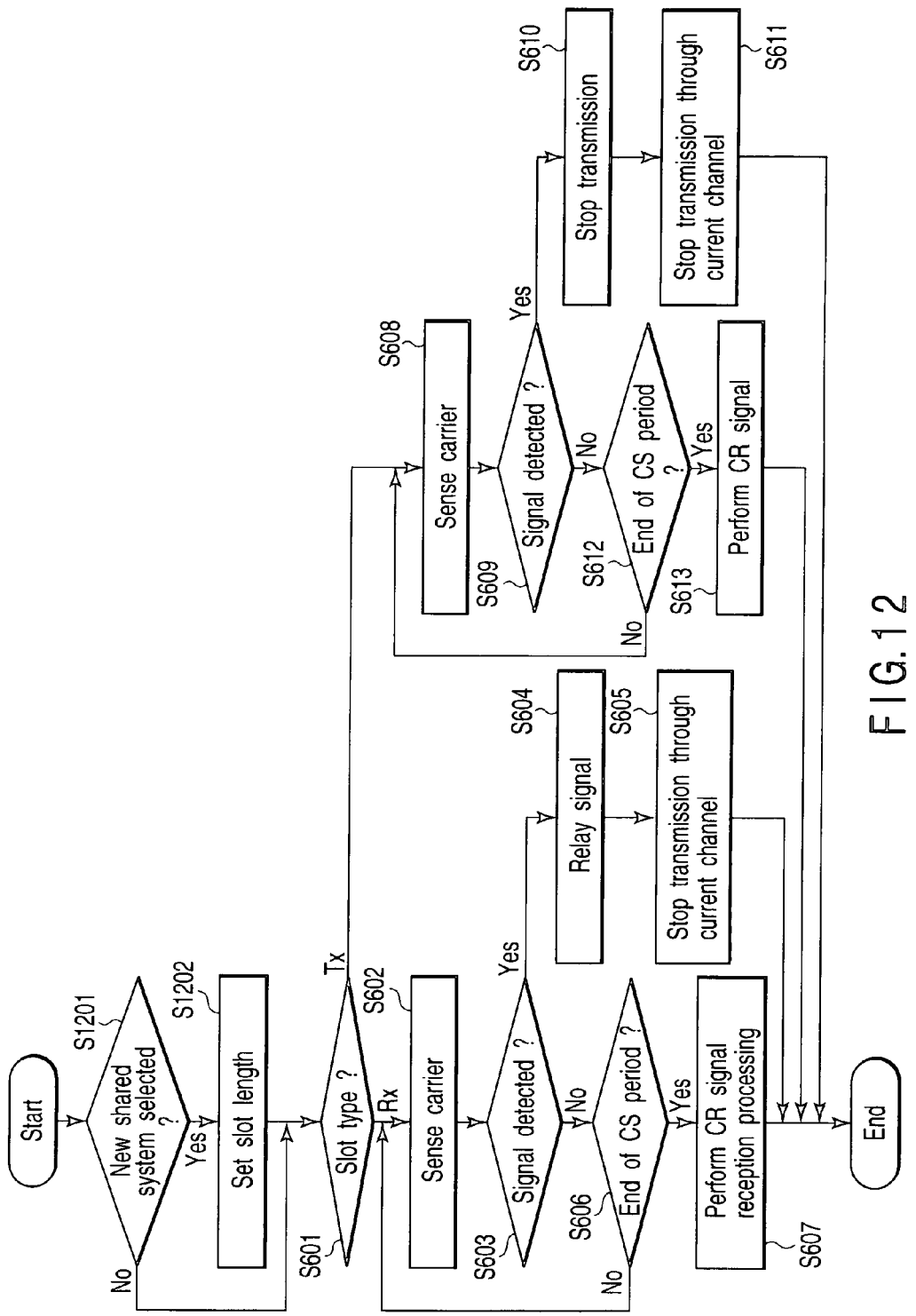
FIG. 12 is a flowchart showing an example of processing by the radio communication apparatus in FIG. 9 within one slot.

An example of processing by the radio terminal A 106 shown in FIG. 9 within one slot will be described next with reference to FIG. 12.

A flowchart for the radio terminal A 106 in the second embodiment differs from that of FIG. 6 in that slot length setting processing is added to the processing by the radio terminal A 106 shown in FIG. 6 within one slot. The same reference numbers as in FIG. 6 denote the same parts in FIG. 12, and a repetitive description will be omitted. The same reference numbers as those of the steps described above denote the same steps, and a description thereof will be omitted.

The radio terminal A 106 determines whether a radio communication system with which the self radio communication system shares a frequency channel is newly selected (step S1201). Upon determining that a radio communication system with which the self radio communication system shares a frequency channel is newly selected, the radio terminal A 106 sets a slot length in accordance with the flowchart shown in FIG. 11 (step S1202), and executes the processing in step S601 and the subsequent steps shown in FIG. 6. The radio terminal A 106 may also receive notification information transmitted by the radio base station A 105 and set a slot length as a slot time length (to be described later with reference to FIG. 18) contained in the notification information. If the self radio communication system shares a frequency channel with the same preceding radio communication system, the radio terminal A 106 executes the processing in step S601 and the subsequent steps shown in FIG. 6 without setting any slot length.

The placement of a radio base station A and radio terminal A which belong to a radio communication system A and a radio communication apparatus B belonging to a radio communication system B in this embodiment will be described next with reference to FIG. 13. Sequences of signals transmitted/received between the radio base station A 105, a radio terminal A1 701, a radio terminal A2 702, radio communication apparatus B1 706 shown in FIG. 13 will be described with reference to FIGS. 14A and 14B.

Figure 13:
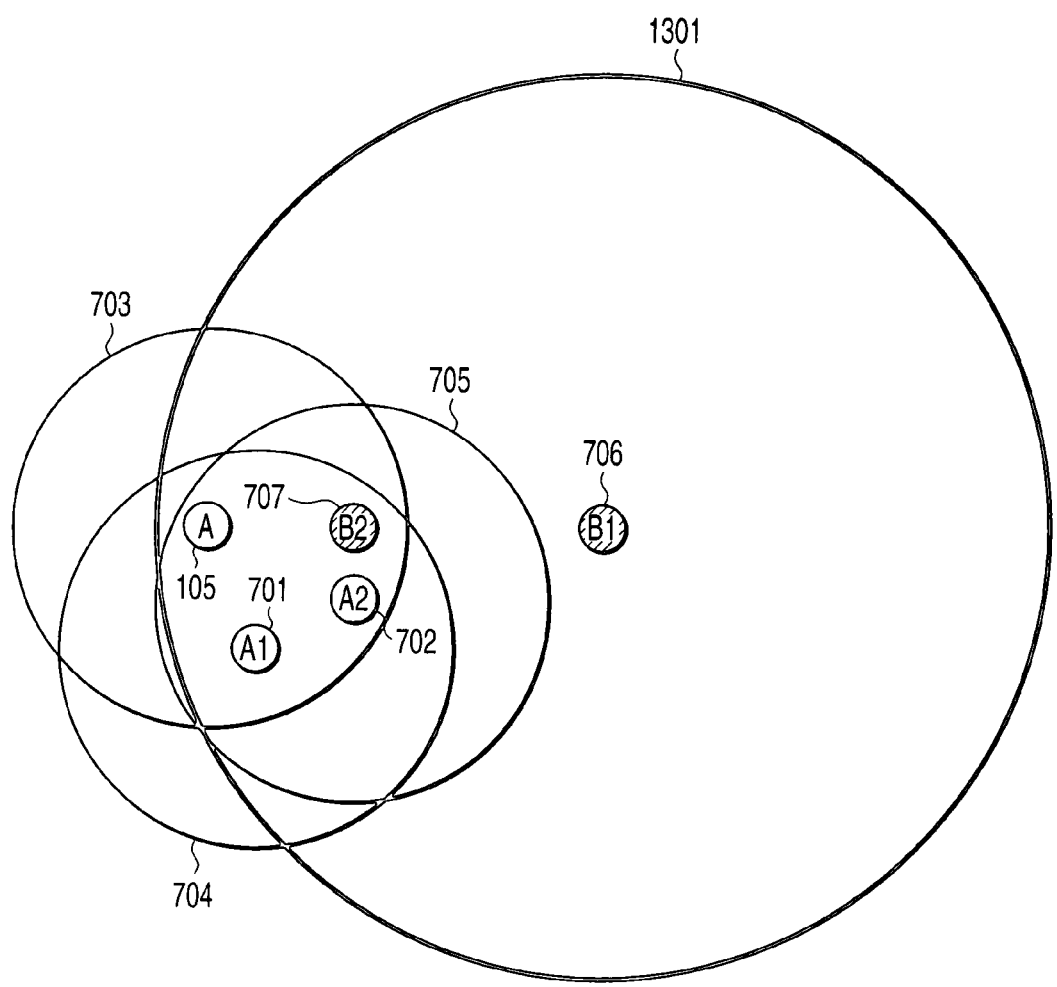
FIG. 13 is a view showing the placement of base stations and terminals in a radio communication system A and radio communication system B according to the second embodiment.

FIG. 13 differs from FIG. 7 in that a coverage 1301 of signals from the radio communication apparatus B1 706 is larger than the coverage 708 of signals from the radio communication apparatus B1 706 shown in the schematic view of FIG. 7.

Figures 14A, 14B:
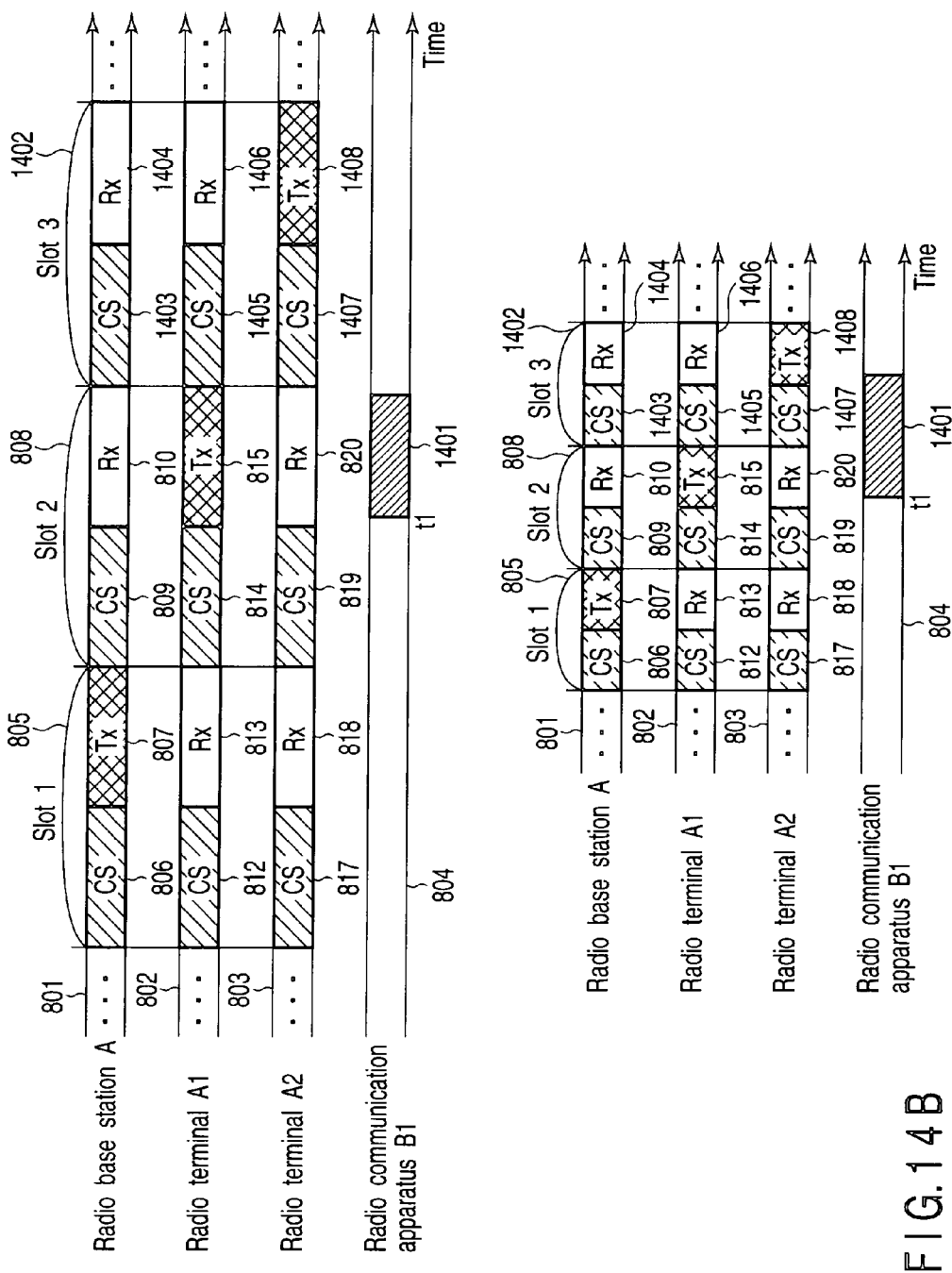
FIG. 14A is a view showing sequences and slot arrangements for a base station and terminals included in the radio communication system A in FIG. 1 and a radio communication apparatus included in the radio communication system B in a case wherein the slot length is greater than that in FIG. 14B.
FIG. 14B is a view showing sequences and slot arrangements for the base station and terminals included in the radio communication system A in FIG. 1 and the radio communication apparatus included in the radio communication system B in a case wherein the slot length is shorter than that in FIG. 14A.

Each of the sequences shown in FIGS. 14A and 14B is obtained by adding a carrier sense period 1403 and signal transmission/reception period 1404 of the radio base station A 105, a carrier sense period 1405 and signal transmission/reception period 1406 of the radio terminal A1 701, and a carrier sense period 1407 and signal transmission/reception period 1408 of the radio terminal A2 702 in a slot 3 1402 to the sequence shown in FIG. 8, together with a signal 1401 representing the minimum duration period in which a signal is continuously transmitted by one transmission in the radio communication system B as a signal which the radio communication apparatus B1 706 transmits to a radio communication apparatus B2 707.

FIG. 14A shows an example of a case wherein the length of the signal transmission/reception period of one slot in the radio communication system A is set to be longer than the minimum duration period in which the signal 1401 is continuously transmitted by one transmission in the radio communication system B. FIG. 14B shows an example of a case wherein the length of the signal transmission/reception period of one slot in the radio communication system A is set to be shorter than the minimum duration period in which the signal 1401 is continuously transmitted by one transmission in the radio communication system B.

As shown in FIG. 13, all the radio communication apparatuses belonging to the radio communication system A can detect the signal 1401 which the radio communication apparatus B1 706 transmits to the radio communication apparatus B2 707. When the signal 1401 is transmitted at the timing shown in FIG. 14A, the radio terminal A1 701 has performed transmission 815 of a signal, and the radio base station A 105 and the radio terminal A2 702 have performed receptions 810 and 820 of the signal which the radio terminal A1 701 has transmitted. For this reason, the signal 1401 which the radio communication apparatus B1 706 transmits to the radio communication apparatus B2 707 cannot be detected In contrast to this, as shown in FIG. 14B, when the length of the signal transmission/reception period of one slot in the radio communication system A is set to be shorter than the minimum burst length in the radio communication system B, the radio terminal A1 701 has performed transmission 815 of a signal and the radio base station A 105 and the radio terminal A2 702 have performed receptions 810 and 820 of the signal which the radio terminal A1 701 has transmitted, at the transmission start timing of the signal 1410 which the radio communication apparatus B1 706 transmits to the radio communication apparatus B2 707. Even after the radio base station A 105, radio terminal A1 701, and radio terminal A2 702 complete transmission/reception of signals in the slot 2 808, since the signal 1401 is continuously transmitted in the radio communication system B, the radio base station A 105, radio terminal A1 701, and radio terminal A2 702 can detect the signal 1401 from the radio communication system B in the carrier sense periods 1403, 1405, and 1407 in the slot 3 1402 in the radio communication system A 101.

According to the second embodiment described above, setting the length of a signal transmission/reception period in one slot in the self radio communication system to be shorter than the minimum duration period in which a signal is continuously transmitted by one transmission in another radio communication system with higher priority makes it possible to reliably detect a signal from another radio communication system with higher priority. Therefore, stopping planned transmission can prevent the self radio communication system from interfering with another radio communication system.

Third Embodiment

A radio terminal A as an example of a radio communication apparatus according to the third embodiment will be described with reference to FIG. 15. FIG. 15 is a block diagram showing an example of the schematic arrangement of a radio terminal A 106 according to the third embodiment.

The radio terminal A 106 differs from the radio terminal A 106 in FIG. 5 in that the control unit 514, local oscillator 515, filter 519, and filter 503 of the radio terminal A 106 shown in FIG. 5 connect to each other through control lines.

A control unit 1501 controls a local oscillator 515, filter 519, and filter 503. The control unit 1501 transfers, to the local oscillator 515, a control signal for changing the oscillation frequency of the local oscillator 515, and transfers, to the filters 519 and 503, control signals for changing the filtering bands of the filters 519 and 503.

Figure 16:
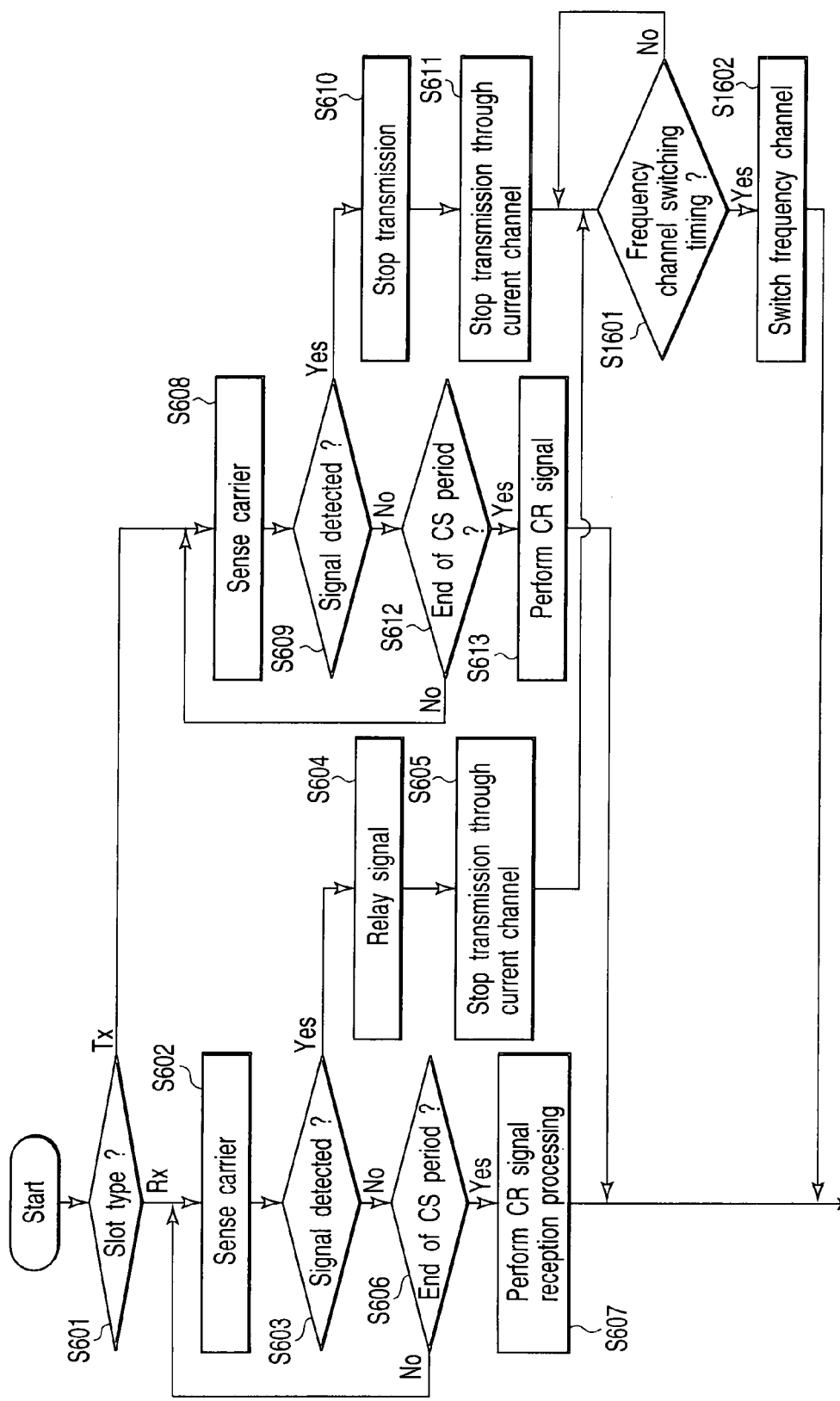
FIG. 16 is a flowchart showing an example of processing by the radio communication apparatus in FIG. 15 within one slot.

An example of processing by the radio terminal A within one slot will be described next with reference to FIG. 16. FIG. 16 is a flowchart showing an example of processing by the radio terminal A 106 shown in FIG. 15 within one slot.

The flowchart of this embodiment differs from that shown in FIG. 6 in that processing associated with frequency channel switching to be performed after processing associated with the stoppage of transmission through the current frequency channel (steps S605 and S611) is added to the processing by the radio terminal A 106 shown in FIG. 6 within one slot. Up to step S605 in FIG. 16, since a reception slot is assigned in step S601 and a signal is detected (step S603) in the carrier sense (step S602) period of the slot, the radio terminal A 106 performs the processing of relaying the signal (step S604) and stopping all transmissions through the current frequency channel (step S605). Up to step S611 in FIG. 16, since a transmission slot is assigned in step S601 and a signal is detected (step S609) in the carrier sense (step S608) period of the slot, the radio terminal A 106 performs the processing of stopping the transmission of the signal (step S610) and stopping all transmissions through the current frequency channel (step S611). After the processing in step S605 or S611, the control unit 1501 within the radio terminal A 106 determines whether the frequency channel switching timing has come (step S1601). The control unit 1501 refers to the notification information shown in FIG. 18 to determine whether the switching timing has come. Upon determining that the switching timing has not come, the control unit 1501 waits for the arrival of the timing. When the switching timing has come, the control unit 1501 controls the local oscillator 515, filter 519, and filter 503 to switch the frequency channel to a predetermined frequency channel (step S1602).

These operations allow the self radio communication system to instantly recognize the existence of another radio communication system, and hence allows the self radio communication system to quickly switch its operating frequency channel to a new frequency channel. This makes it possible to suppress the time of communication interruption to a short time.

A frame format in a radio communication system A 101 according to this embodiment will be described next with reference to FIG. 17.

Referring to FIG. 17, a frame 1700 in the radio communication system A 101 contains a plurality of slots (from a slot 1703 to a slot 1708), each slot containing a carrier sense period 1701 and a signal transmission/reception period 1702. The frame 1700 in the radio communication system A contains the notification information slot 1703, control information slots 1704 and 1705, and data slots 1706, 1707, and 1708. Radio communication is performed by repeatedly using this frame. In all slots, as indicated by the flowchart of FIG. 6, if a radio communication apparatus to which a transmission slot is assigned detects no signal in the carrier sense period 1701 of the transmission slot, the apparatus transmits a signal in the signal transmission/reception period 1702 of the slot.

In the notification information slot 1703, a radio base station A 105 transmits information to be commonly notified to all the radio terminals A 106 belonging to the radio communication system A. The control information slots 1704 and 1705 are used when, for example, the radio terminal A 106 which is not registered in the radio communication system A 101 transmits registration request information or the radio base station A 105 transmits registration response information to the radio terminal A 106 which has transmitted a registration request. The data slots 1706, 1707, and 1708 are used when application data are transmitted.

In this manner, in the radio communication system A 101, performing radio communication by repeatedly using a frame containing a notification information slot, control information slots, and data slots makes it possible to periodically transmit notification information and control information, thereby performing control in the radio communication system A 101 in accordance with conditions outside and inside the radio communication system A 101.

The contents of notification information which the radio base station A 105 transmits will be described next with reference to FIG. 18.

Notification information 1800 which the radio base station A 105 transmits contains a system identifier 1801, selected frequency channel 1802, switching destination frequency channel 1803, frequency switching timing 1804, slot time length 1805, carrier sense period length 1806, signal transmission/reception period length 1807, notification information transmission cycle 1808, control information slot count 1809, data slot 1 1810, data slot 2 1811, and data slot 3 1812.

The system identifier 1801 indicates an identifier indicating a system. The selected frequency channel 1802 indicates information about a frequency channel through which the radio communication system A 101 is performing radio communication. The switching destination frequency channel 1803 indicates information about a frequency channel as a switching destination in frequency switching operation. The frequency switching timing 1804 indicates information about the switching timing of frequency switching.

The slot time length 1805 indicates the time length of a slot used in the system. The carrier sense period length 1806 indicates a carrier sense period length in the slot. The signal transmission/reception period length 1807 indicates a signal transmission/reception period length in the slot. The notification information transmission cycle 1808 indicates the transmission cycle of notification information. The control information slot count 1809 indicates the number of slots of control information.

The data slot 1 transmission right assignment information 1810 indicates information of a radio terminal to which a transmission right is assigned in data slot 1. The data slot 2 transmission right assignment information 1811 indicates information of a radio terminal to which a transmission right is assigned in data slot 2. The data slot 3 transmission right assignment information 1812 indicates information of a radio terminal to which a transmission right is assigned in data slot 3.

A specific example of notification information 1900 which the radio base station A 105 shown in FIG. 18 transmits will be described next with reference to FIG. 19.

Referring to FIG. 19, a system identifier 1901 is set to "System A". A frequency channel 1902 through which the radio communication system A 101 is currently performing radio communication is "600 MHz". A frequency channel 1903 as a switching destination in frequency switching operation is set to "612 MHz". Instead of this setting, index numbers indicating frequency channels may be used for setting. A switching timing 1904 in frequency switching operation is set to "2 slots". This indicates, for example, that radio communication starts by using a frequency channel as a switching destination two slots after the end of a slot in which a signal from another radio communication system is detected. Consider another example. When the switching timing 1904 is set to "after 5 ms", this indicates, for example, that radio communication starts by using a frequency channel as a switching destination 5 ms after the end of a slot in which a signal from another radio communication system is detected.

A time length 1905 of a slot is set to "1 ms", a carrier sensor period length 1906 of the slot is set to "0.5 ms", and a signal transmission/reception period length 1907 of the slot is set to "0.5 ms". A slot count 1908 of one frame is set to "6", and a slot count 1909 of control information is set to "2". This indicates that notification information is transmitted in the start slot of six slots, and the next two slots of notification information slots are slots for control information. Information 1910 of a radio terminal to which a transmission right is assigned in data slot 1 is set to "A", information 1911 of a radio terminal to which a transmission right is assigned in data slot 2 is set to "A1", and information 1912 of a radio terminal to which a transmission right is assigned in data slot 3 is set to "A2". This indicates that in data slots 1, 2, and 3, transmission slots are assigned to the radio base station A, the radio terminal A1, and the radio terminal A2.

According to the third embodiment described above, periodically transmitting information about a slot length and a carrier sense period and signal transmission/reception period in the slot while containing the information in notification information allows radio communication apparatuses belonging to the radio communication system A to synchronously operate. In addition, periodically transmitting information about a destination frequency channel in frequency switching operation and switching timing information while containing them in notification information allows the radio communication apparatuses belonging to the radio communication system A to synchronously switch frequency channels. Furthermore, periodically transmitting information (schedule information) of each radio communication apparatus to which a transmission right is assigned in each data slot which containing the information in notification information makes it possible to transmit/receive data without any collision of signals within the radio communication system A.

It suffices to determine a frequency channel as a switching destination in frequency switching operation on the basis of a priority table generated by scanning frequency channels before the radio base station A 105 starts radio communication with the radio terminal A 106. An example of the processing of generating a priority table for a frequency channel as a switching destination in frequency switching operation by scanning frequency channels before the radio base station A 105 starts radio communication with the radio terminal A 106 will be described with reference to FIG. 20.

The control unit 1501 of the radio base station A 105 controls the local oscillator 515, filter 519, and filter 503 to make setting for a frequency channel to be scanned (step S2001). Upon completing the setting for the frequency channel to be scanned, the control unit 1501 scans the set frequency channel (step S2002). Scanning is the processing of observing the proportion at which a radio communication system B sharing the frequency channel uses the set frequency channel. Upon completing scanning of the set frequency channel, the control unit 1501 determines whether scanning of all frequency channels is complete (step S2003). If scanning of all the frequency channels is not complete, the control unit 1501 makes setting for a frequency channel which has not been scanned (step S2001), and performs scanning (step S2002). Upon completion of scanning of all the frequency channels, the control unit 1501 generates a priority table for frequency channels on the basis of the scanning result (step S2004), and stores the table in a memory. The control unit 1501 incorporates this memory. Assume that priority levels are assigned to the respective frequency channels such that a higher priority level is assigned to a frequency channel which the radio communication system B sharing the frequency channels uses at a lower proportion.

Figures 20, 21:
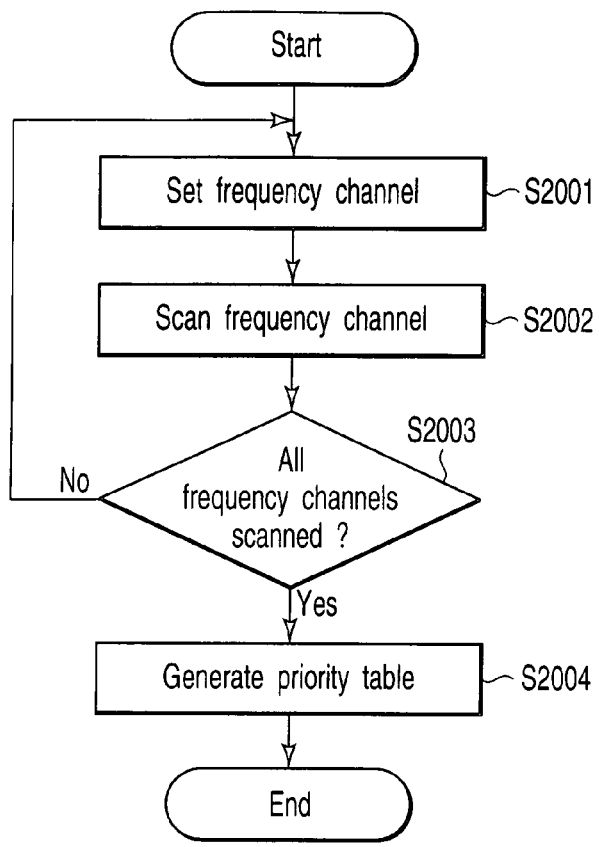
FIG. 20 is a flowchart showing an example of processing performed by the radio base station A in the third embodiment to generate a priority table.
FIG. 21 is a view showing an example of the priority table generated in FIG. 20.

An example of a priority table for frequency channels as switching destinations in frequency switching operation will be described next with reference to FIG. 21.

Assume that the radio base station A 105 and the radio terminal A 106 are performing radio communication through, for example, frequency channel 3 (Ch. 3). FIG. 21 shows the priority levels of frequency channels as switching destinations in frequency switching operation in descending order, i.e., in the order of Ch. 5, Ch. 2, Ch. 1, Ch. 6, and Ch. 4. For example, when the radio base station A 105 and the radio terminal A 106 detect a signal from the radio communication system B in frequency channel 3 (Ch. 3) and are to switch the frequency channel, they switch it to frequency channel 5 (Ch. 5).

According to the third embodiment described above, scanning frequency channels in advance and holding a priority table for the frequency channels allow to easily select a frequency channel as a switching destination when another radio communication system is detected in the current frequency channel and the frequency channel is to be switched to another frequency channel.

In addition, since a signal to be non-regeneratively transmitted upon detection of a signal in the carrier sense period in a reception slot is a signal itself from another radio communication system, a radio communication apparatus belonging to the other radio communication system can improve its reception characteristics owing to the path diversity effect based on the signal non-regeneratively transmitted and the signal directly received from the base station.

Fourth Embodiment

The schematic arrangement of a radio terminal A 106 as an example of a radio communication apparatus according to the fourth embodiment is the same as that of the radio terminal A of the third embodiment. An example of processing by the radio terminal A 106 shown in FIG. 15 within one slot will be described with reference to the flowchart of FIG. 22.

Figure 22:
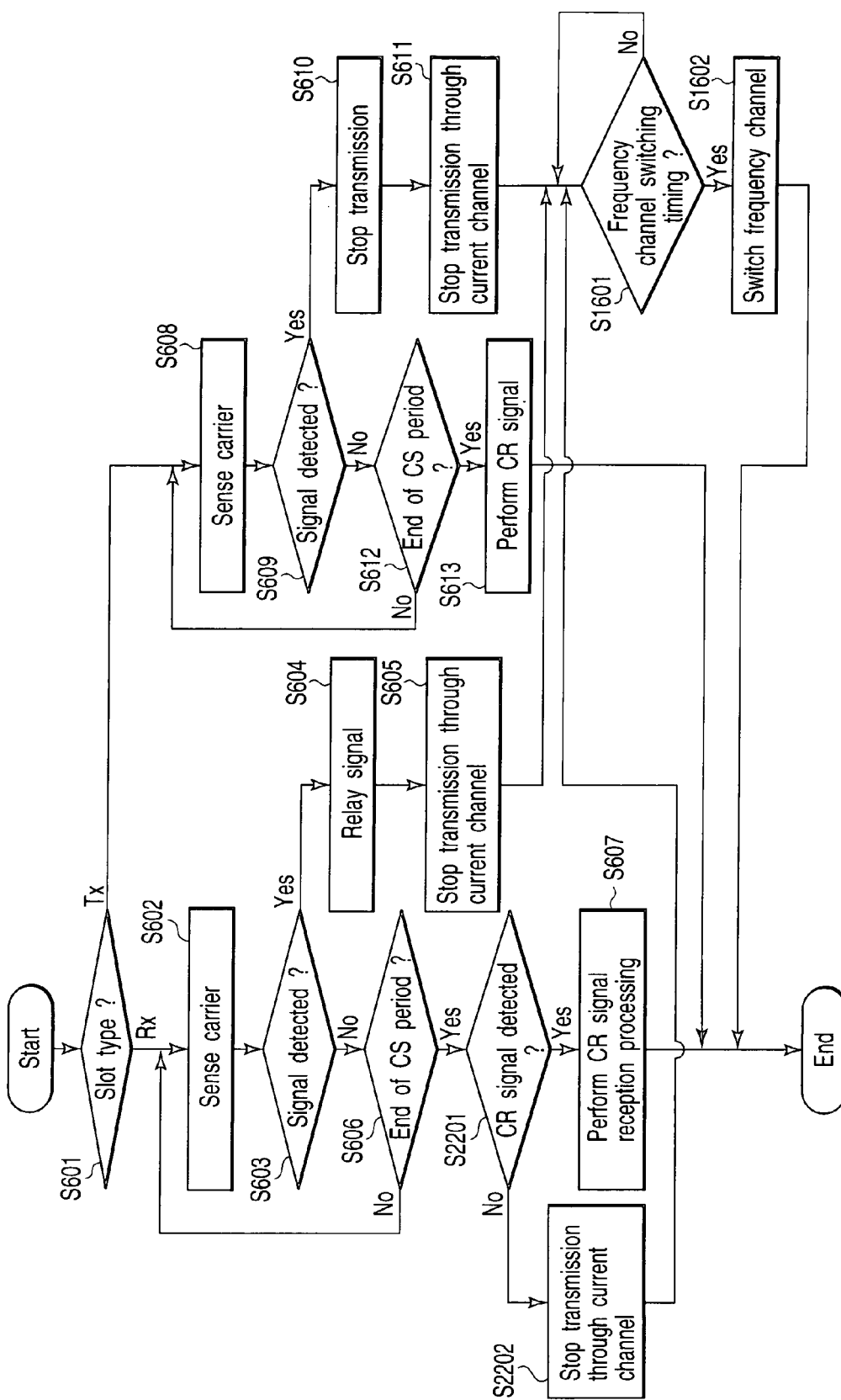
FIG. 22 is a flowchart showing an example of processing by a radio communication apparatus in the fourth embodiment within one slot.

The flowchart shown in FIG. 22 differs from that shown in FIG. 16 in that determination on whether a signal from the radio communication system A is detected (step S2201) and the processing to be performed when no signal from the radio communication system A is detected (step S2202) are added to the processing by the radio terminal A 106 shown in FIG. 16 within one slot after the carrier sense period in a reception slot (step S606). The same reference numbers as in FIG. 16 denote the same parts in FIG. 22, and a repetitive description will be omitted.

In step S601 in FIG. 22, a reception slot is assigned to the radio terminal A 106. The radio terminal A 106 which has detected no signal (step S603) during the carrier sense (step S602) period in the slot and terminated the carrier sense period (step S606) determines whether a signal is detected in the signal transmission/reception period in the slot (step S2201). Upon detecting a signal, the radio terminal A 106 performs reception processing of the signal (step S607). Upon detecting no signal in this signal transmission/reception period, the radio terminal A 106 stops all transmissions through the current frequency channel (step S2202), and a control unit 1501 determines whether the frequency channel switching timing has come (step S1601). If the switching timing has not come, the control unit 1501 waits for the arrival of the timing. When the switching timing has come, the control unit 1501 controls a local oscillator 515, filter 519, and filter 503 to switch the current frequency channel to a predetermined frequency channel (step S1602).

The placement of a radio base station A 105, a radio terminal A1 701, and a radio terminal A2 702 which belong to a radio communication system A and a radio communication apparatus B1 2301 and a radio communication apparatus B2 707 which belong to a radio communication system B according to this embodiment will be described with reference to FIG. 23.

Figure 23:
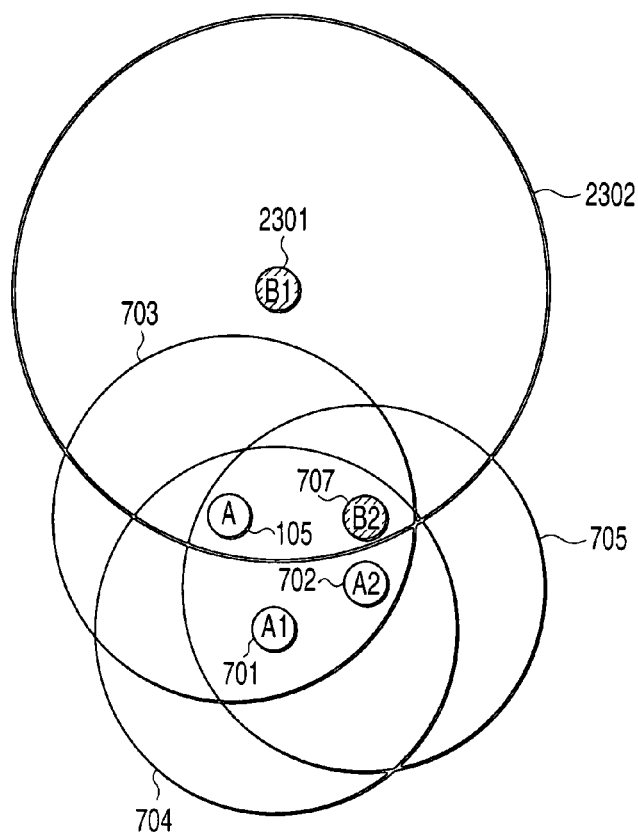
FIG. 23 is a view showing the placement of base stations and terminals in a radio communication system A and radio communication system B according to the fourth embodiment.

The placement in FIG. 23 differs from that in FIG. 7 in that the radio communication apparatus B1 2301 is placed at a position different from that of the radio communication apparatus B1 706 shown in FIG. 7. Therefore, the same reference numbers as in FIG. 7 denote the same parts in FIG. 23, and a repetitive description will be omitted. According to the placement shown in FIG. 23, only the radio base station A 105 of the radio communication apparatuses belonging to the radio communication system A 101 can detect a signal which the radio communication apparatus B1 2301 (a coverage 2302 of signals) transmits to the radio communication apparatus B2 707.

A sequence of signals to be transmitted/received between the radio base station A 105, radio terminal A1 701, radio terminal A2 702, and radio communication apparatus B1 2301 shown in FIG. 23 will be described next with reference to FIG. 24.

The transmission start timing of a signal 2404 which the radio communication apparatus B1 2301 transmits is set at a timing different from that shown in FIG. 8. In addition, the operations of the radio base station A 105, radio terminal A1 701, and radio terminal A2 702 within a slot 2 808 differ from those shown in FIG. 8. Therefore, the same reference numbers as in FIG. 8 denote the same parts in FIG. 23, and a repetitive description will be omitted.

Figure 24:
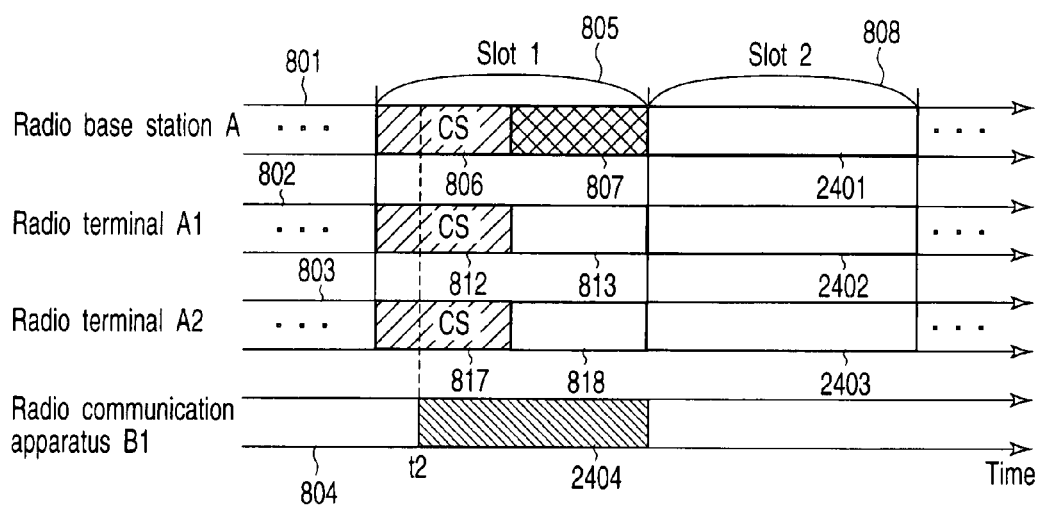
FIG. 24 is a view showing sequences and slot arrangements for a base station and terminals included in the radio communication system A in FIG. 23 and a radio communication apparatus included in the radio communication system B in FIG. 23.

Referring to FIG. 24, the radio communication apparatus B1 2301 transmits the signal 2404 to the radio communication apparatus B2 707 at time t2. As shown in FIG. 23, only the radio base station A 105 of the radio communication apparatuses belonging to the radio communication system A can detect the signal 2404. Upon detecting the signal 2404 which the radio communication apparatus B1 2301 transmits in a carrier sense period 806 of a slot 1 805, the radio base station A 105 stops transmitting a signal which is planned to be transmitted in a signal transmission/reception period 807 of the slot, and performs channel switching 2401 to a predetermined frequency channel in the slot 2 808 following the slot 1 805. The radio terminal A1 701 and radio terminal A2 702 to which the slots 1 805 are assigned as reception slots detect no signals in signal transmission/reception periods 813 and 818 of the slots. For this reason, radio terminal A1 701 and radio terminal A2 702 recognize that the transmission of the signal is stopped, because the radio base station A 105 to which a transmission slot is assigned detects a signal from another radio communication system, and perform channel switchings 2402 and 2403 to, for example, predetermined frequency channels in the slots 2 808 following the slots 1 805.

According to the fourth embodiment described above, when a radio communication apparatus which is planned to perform transmission in a given slot detects a signal from another radio communication system in the carrier sense period contained in the slot, the radio communication apparatus stops the transmission of a signal planned to be transmitted. This makes it impossible for another radio communication apparatus belonging to the same radio communication system as that to which the radio communication apparatus belongs to detect any signal planned to be transmitted. This allows the radio communication apparatus which has stopped transmission to detect a signal from the other radio communication system.

In addition, determining in advance a destination channel in channel switching when a radio communication apparatus belonging to the same radio communication system detects a signal from another radio communication system makes it possible to continue communication within the radio communication system even if a signal from the other radio communication system is detected.

Fifth Embodiment

Figure 25:
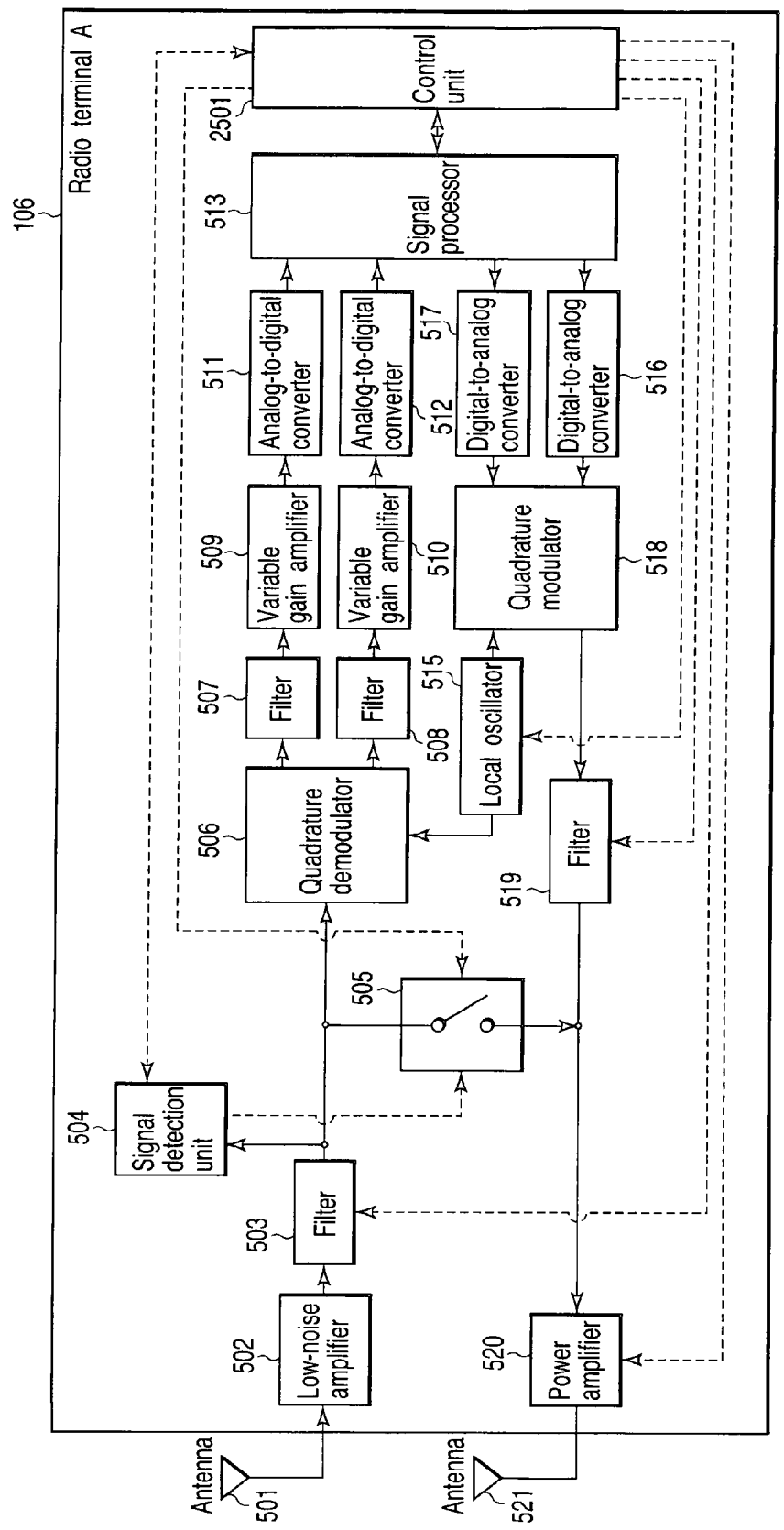
FIG. 25 is a block diagram showing an example of a radio communication apparatus according to the fifth embodiment.

A radio terminal A as an example of a radio communication apparatus according to the fifth embodiment will be described with reference to FIG. 25. FIG. 25 is a block diagram showing an example of the schematic arrangement of a radio terminal A 106 according to an embodiment of the present invention.

The radio terminal A 106 of the fifth embodiment differs from the radio terminal A 106 in FIG. 15 in that a control unit 2501 of a radio terminal A 106 and a power amplifier 520 shown in FIG. 25 connect to each other through a control line. Therefore, the same reference numbers as in FIG. 15 denote the same parts in FIG. 25, and a repetitive description will be omitted.

The control unit 2501 controls the power amplification amount of the power amplifier 520. The control unit 2501 outputs a control signal to the power amplifier 520 to perform transmission power control on a signal to be relayed, thereby performing control so as to non-regeneratively relay the signal. The control unit 2501 performs transmission power control in consideration of a propagation loss. The details of the control unit 2501 will be described later with reference to FIGS. 27 and 28.

Figure 26:
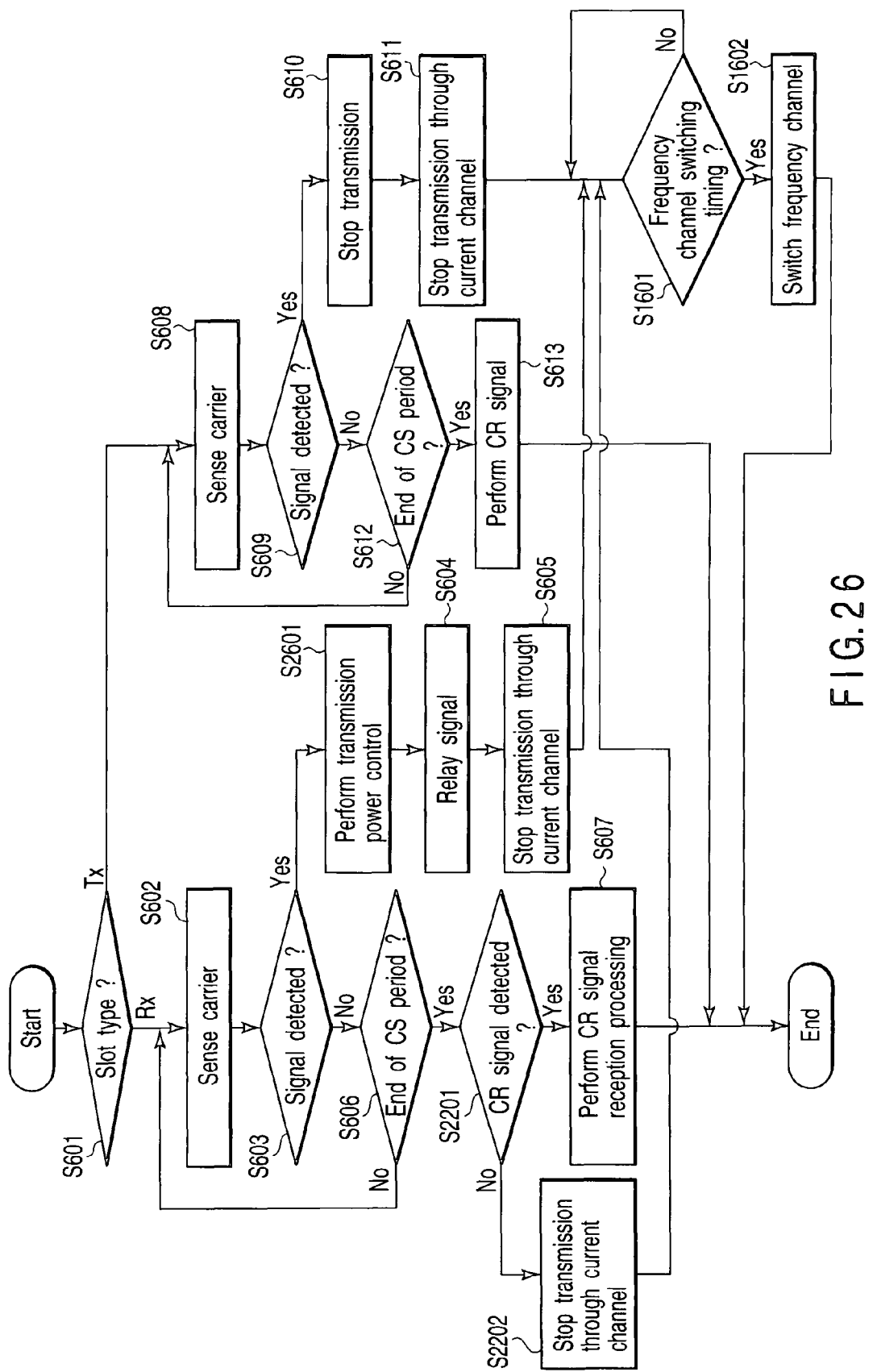
FIG. 26 is a flowchart showing an example of processing by the radio communication apparatus in FIG. 25 within one slot.

Processing by a radio terminal A within one slot will be described next with reference to FIG. 26. FIG. 26 is a flowchart showing an example of processing by the radio terminal A 106 shown in FIG. 25 within one slot.

The flowchart of this embodiment differs from that shown in FIG. 22 in that the processing of controlling transmission power (step S2601) is added to the processing by the radio terminal A 106 within one slot, which is shown in FIG. 22, after a signal is detected (step S603) in the carrier sense period (step S602) in a reception slot. Therefore, the same reference numbers as in FIG. 22 denote the same parts in FIG. 26, and a repetitive description will be omitted.

In step S601 in FIG. 26, a reception slot is assigned to the radio terminal A 106. The control unit 2501 of the radio terminal A 106 which has detected a signal (step S603) during the carrier sense (step S602) period in the slot outputs a control signal to the power amplifier 520, and performs transmission power control on a signal to be relayed (step S2601), thereby non-regeneratively relaying the signal.

The format of a signal which a radio base station A 105 and the radio terminal A 106, which belong to a radio communication system A 101, transmit in a data slot will be described next with reference to FIG. 27.

A format 2700 of a signal which the radio base station A 105 and the radio terminal A 106 transmit in a data slot contains a header 2701 and data 2702. The header 2701 has a field 2703 in which transmission power for the transmission of this signal is written. In the field 2703, the power by which the transmitting side transmits the signal with the format 2700 is written in the field 2703. The field 2703 of the transmission power allows the radio base station A 105 and the radio terminal A 106 to calculate a propagation loss with respect to a communication partner. If T [dBm] is written in the field of the transmission power of the signal with the format 2700 which the radio terminal A2 receives from the radio base station A 105 and the reception power of the radio terminal A2 at the time of the reception of the signal 2700 with the format 2700 is R [dBm], a propagation loss L (A2-A) between the radio terminal A2 and the radio base station A can be obtained as $$L(A2-A)=T-R \qquad \text{equation (1)}$$

If, for example, the transmission power is 10 dBm and the reception power of this signal is −40 dBm, propagation loss L (A2-A) is given by $$L(A2-A)=10-(-40)=50 \text{ [dBm]} \qquad \text{equation (2)}$$

Likewise, if 20 dBm is written in the transmission power field of the signal with the format 2700 which the radio terminal A2 has received from the radio terminal A1, and the reception power at the time of the reception of the signal is −60 dBm, a propagation loss L (A2-A1) between the radio terminal A2 and the radio terminal A1 is given by $$L(A2-A1)=20-(-60)=80 \text{ [dBm]} \qquad \text{equation (3)}$$

Figures 27, 28:
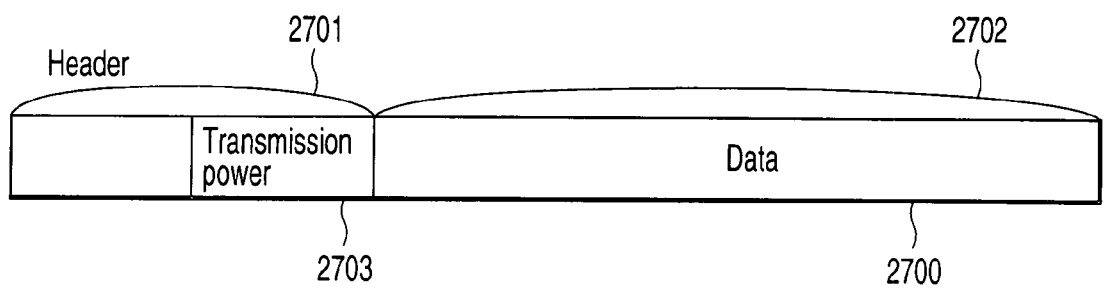
FIG. 27 is a view showing the format of a signal which a radio base station A and radio terminal A according to the fifth embodiment transmit in a data slot.
FIG. 28 is a view showing an example of a propagation loss table generated by a radio terminal A1.

FIG. 28 shows an example of a table of propagation losses between the radio base station A 105 and the radio terminal A2, which the radio terminal A1 generates by the above method. A memory in the control unit 2501 of the radio terminal A1 stores this table. For example, such a table is generated at the start of communication, and is periodically updated.

Assume that Th [dBm] represents a reception power threshold which is used to determine whether a signal is detected in the carrier sense period in a slot in the radio communication system A 101. In the carrier sense period, a signal detection unit 504 shown in FIG. 25 measures the reception power of an input signal, and determines the detection of a signal when the measured reception power exceeds the threshold Th. The control unit 2501 of the radio terminal A2, to which a reception slot is assigned in step S601 in FIG. 26 and which detects (step S603) a signal in the carrier sense (step S602) period in the slot, outputs a control signal to the power amplifier 520 to relay a signal. In this case, when a minimum propagation loss Lmin is selected from the propagation losses shown in FIG. 28, the transmission power Tr [dBm] of this signal is obtained as follows:

$$Tr=Th+L\text{min}+3 \text{ [dBm]} \qquad \text{equation (4)}$$

where +3 represents a margin, which can take another value, e.g., +2 or +5. In equation (4) given above, if the reception power threshold used to determine whether a signal is detected in the carrier sense period is −80 dBm, the transmission power Tr [dBm] by which the radio terminal A2 relays the detected signal is given by $$Tr=-80+50+3=-27 \text{ [dBm]} \qquad \text{equation (5)}$$

According to the fifth embodiment described above, when a signal is detected in the carrier sense period within a slot, setting the transmission power by which this signal is relayed to the minimum necessary transmission power makes it possible to suppress unnecessary power consumption. In addition, when the delay of the signal to be relayed is large, this can suppress interference with a radio communication apparatus belonging to another radio communication system.

Sixth Embodiment

The same block diagram as that of FIG. 25 shows an example of the schematic arrangement of a radio terminal A 106 according to the sixth embodiment.

Figure 29:
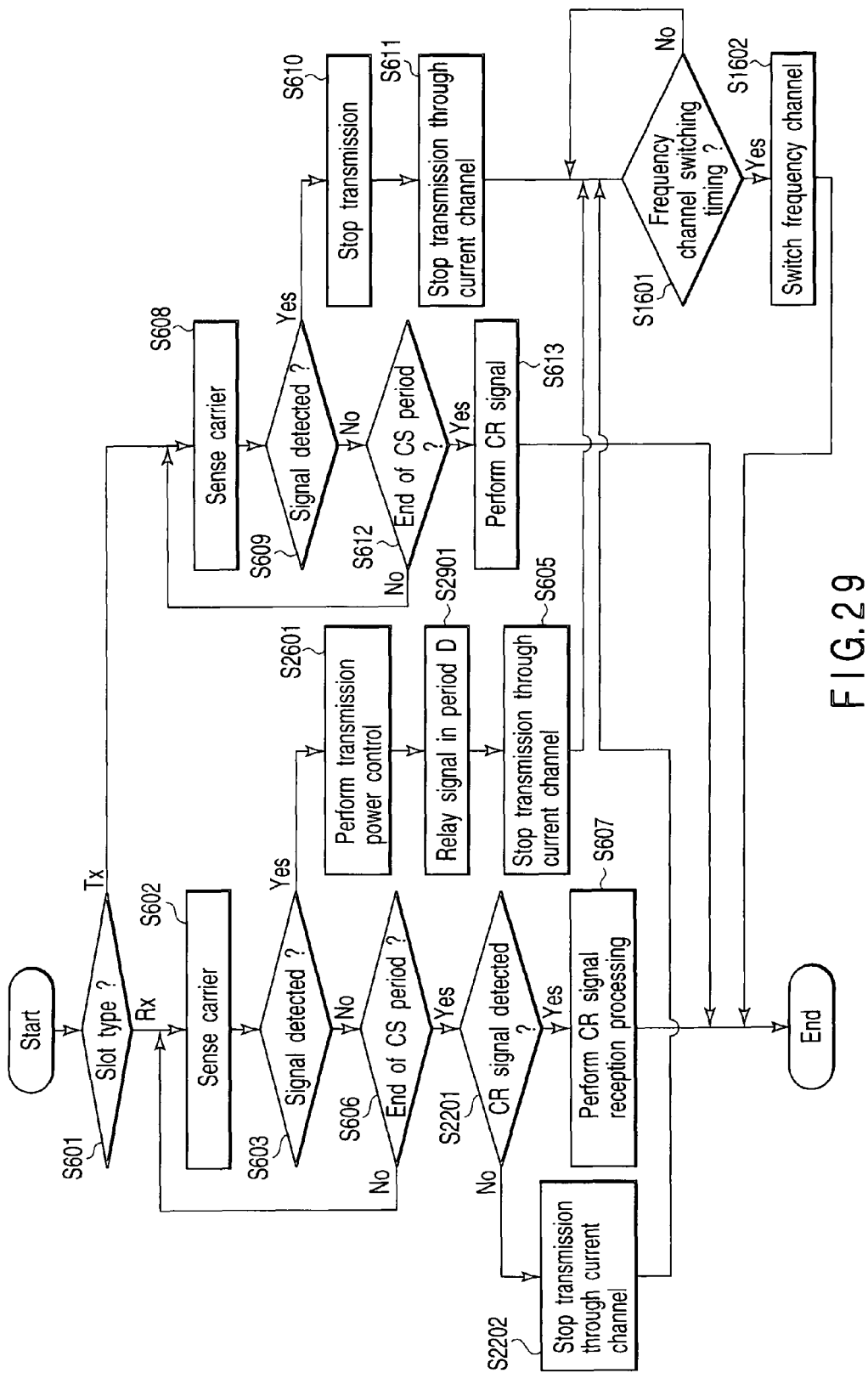
FIG. 29 is a flowchart showing an example of processing by a radio communication apparatus according to the sixth embodiment within one slot.

Processing by a radio terminal A within one slot will be described with reference to FIG. 29. FIG. 29 is a flowchart showing an example of processing by the radio terminal A 106 of this embodiment within one slot.

The flowchart of this embodiment differs from that of FIG. 26 in that the processing of relaying a signal in a transmission period is replaced by the processing of relaying a signal in a limited period D (step S2901) in the processing by the radio terminal A 106 shown in FIG. 25 within one slot after a signal is detected (step S603) in the carrier sense period (step S602) of the reception slot, and transmission power is controlled (step S2601). Therefore, the same reference numbers as in FIG. 26 denote the same parts in FIG. 29, and a repetitive description will be omitted. In this case, the period D represents a signal averaging time when a radio base station A 105 and the radio terminal A 106 measure the reception power of an input signal in a carrier sense period. A radio communication apparatus detects the reception power of a signal by averaging the signal upon selecting 10 ms as the period D, which can be said to be an example of the minimum period. Alternatively, the apparatus may select a carrier sense period as the period D, which is an example of the maximum period. The period D may be contained in the notification information shown in FIG. 18 and changed in accordance with the information.

A control unit 2501 of the radio terminal A 106 to which a reception slot is assigned in step S601 in FIG. 29 and which has detected a signal in the carrier sense (step S602) period within the slot outputs a control signal to a power amplifier 520 to perform transmission power control on a signal to be relayed (step S2601), and non-regeneratively relays the signal only in the period D (step S2901).

The relationship between a signal from a radio communication system B, which is input to the radio terminal A 106 from a time within the carrier sense period of a slot, and a signal relayed by the radio terminal A 106 will be described next with reference to FIGS. 30A and 30B.

Figure 30A:
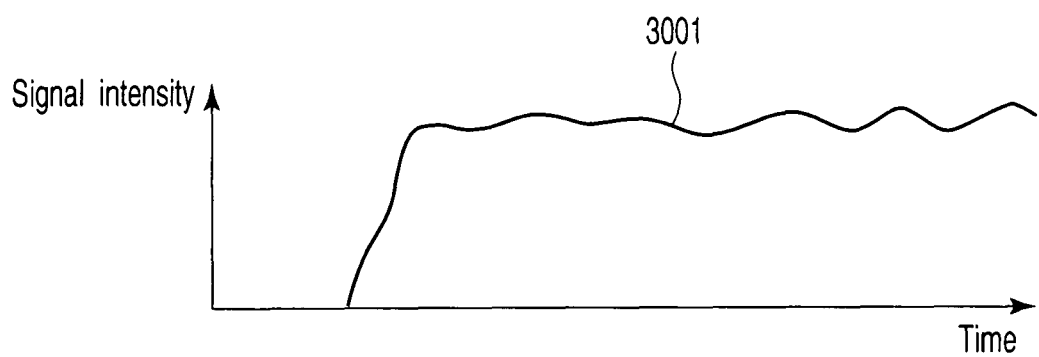
FIG. 30A is a graph showing, as a function of time, a change in the signal intensity of a signal from a radio communication system B, which is input to a radio terminal A from a given time in the carrier sense period in a slot.
Figure 30B:
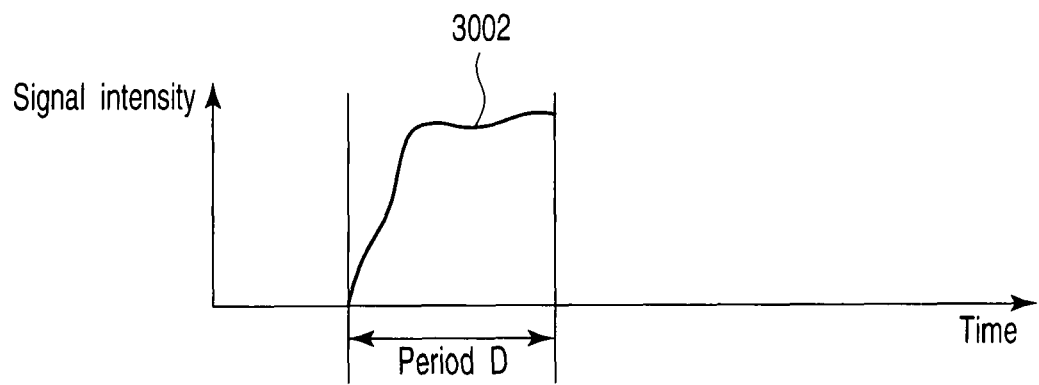
FIG. 30B is a graph showing that a signal which a radio terminal A 106 relays is limited to a period D.

FIGS. 30A and 30B show that a signal 3002 relayed by the radio terminal A 106 is limited to the period D in contrast with a signal 3001 from the radio communication system B which is input to the radio terminal A 106 from a given time within the carrier sense period of a slot.

It suffices to change the transmission time of a signal to be relayed when a radio terminal belonging to the radio communication system A detects a signal in the carrier sense period of a reception slot, in accordance with the type in the radio communication system B. Making a radio terminal belonging to the radio communication system A retransmit a signal from the radio communication system B in accordance with the signal format of the radio communication system B can avoid influences on the signal receiving operation of a radio terminal belonging to the radio communication system B.

According to the sixth embodiment described above, when a signal is detected in the carrier sense period of a slot, setting the signal transmission period in which this signal is relayed to the minimum necessary time makes it possible to suppress unnecessary power consumption. In addition, when the delay of the signal to be relayed is large, this can suppress interference with a radio communication apparatus belonging to another radio communication system.

According to the above embodiments, when only a radio communication apparatus in a reception slot state detects a signal from another radio communication system in a carrier sense period, and a radio communication apparatus in a transmission slot state detects no signal from the other radio communication system in the carrier sense period, relaying the signal from the other radio communication system which the radio communication apparatus in the reception slot state has detected makes it possible to notify the radio communication apparatus in the transmission slot state of the existence of the other radio communication system. Therefore, making the radio communication apparatus in the transmission slot state stop transmitting the signal can avoid interference with a radio communication apparatus belonging to the other radio communication system.

In addition, since a radio communication apparatus in a reception slot state detects and relays a signal from another radio communication system, all the radio communication apparatuses constituting the self radio communication system can recognize the existence of the other radio communication system. This makes it possible to quickly switch the frequency channel used by the radio communication system to another frequency channel, thereby allowing seamless communication.

Furthermore, since a signal which a radio communication apparatus in the reception slot state detects and relays is a signal itself from another radio communication system, the reception characteristics of a radio communication apparatus belonging to the other radio communication system can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus, comprising:
   a first detection unit configured to detect a first signal in a first carrier sense period contained in a pre assigned reception slot;
   a relaying unit configured to relay the detected first signal;
   a second detection unit configured to detect a second signal in a second carrier sense period contained in a pre assigned transmission slot; and
   a stopping unit configured to stop transmission in the transmission slot when the second detection unit detects the second signal.

2. The apparatus according to claim 1, further comprising:
   a reception unit configured to receive a third signal in a signal transmission/reception period contained in the pre assigned reception slot;
   a second stopping unit configured to stop transmitting a signal when the reception unit receives no signal, the first detection unit detects the first signal, or the second detection unit detects the second signal; and
   a switching unit configured to switch, at a predetermined timing, a frequency from a frequency channel in which the transmission is stopped to a predetermined frequency channel.

3. The apparatus according to claim 2, wherein the carrier sense period, the signal transmission/reception period, a time length of the slot, and the predetermined frequency channel are described in notification information which another radio communication apparatus transmits.

4. The apparatus according to claim 1, wherein the relaying unit transmits the detected signal by a non regenerative scheme without demodulation processing and modulation processing.

5. The apparatus according to claim 1, further comprising a setting unit configured to set a signal transmission/reception period contained in the reception slot and the transmission slot to be shorter than a duration period which a signal is continuously transmitted by one transmission, the duration period being set in another radio communication system.

6. The apparatus according to claim 1, wherein schedule information which is information of a radio communication apparatus to which a transmission right is assigned in a slot is described in notification information which another radio communication apparatus transmits.

7. The apparatus according to claim 1, wherein a network identifier which identifies a network of a radio communication system to which the apparatus belongs, a first frequency channel through which radio communication is performed, a second frequency channel as a switching destination in frequency switching operation, and the number of slots contained in one frame are described in notification information which another radio communication apparatus transmits.

8. The apparatus according to claim 1, wherein transmission and reception are performed by using a frame format containing a slot in which another radio communication apparatus transmits notification information, a slot in which control information is transmitted, and a slot in which data is transmitted.

9. The apparatus according to claim 1, wherein transmission power by which the relaying unit relays the detected first signal is the same as transmission power by which another radio communication apparatus transmits data.

10. The apparatus according to claim 1, wherein transmission power by which the relaying unit relays the detected first signal is higher than a signal detection level in a carrier sense period in another radio communication apparatus.

11. The apparatus according to claim 1, wherein a transmission time in which the relaying unit relays the detected first signal is a signal averaging time when reception power of a signal input in a carrier sense period in another radio communication apparatus is measured.

12. The apparatus according to claim 1, wherein a transmission time in which the relaying unit relays the detected first signal is changed in accordance with a type of another radio communication system.

13. A non-transitory computer readable storage medium storing instructions of a computer program which when executed by a computer results in performance of steps comprising:
 detecting a first signal in a first carrier sense period contained in a pre assigned reception slot;
 relaying the detected first signal;
 detecting a second signal in a second carrier sense period contained in a pre assigned transmission slot; and
 stopping transmission in the transmission slot when the second signal is detected.

14. A computer system for radio communications, comprising:
 means for detecting a first signal in a first carrier sense period contained in a pre assigned reception slot;
 means for relaying the detected first signal;
 means for detecting a second signal in a second carrier sense period contained in a pre assigned transmission slot; and
 means for stopping transmission in the transmission slot when the second signal is detected.

* * * * *